United States Patent
Regat

[15] 3,706,025
[45] Dec. 12, 1972

[54] INDUCTION LOGGING METHODS AND APPARATUS USING MORE THAN ONE PHASE COMPONENT OF THE RECEIVED SIGNAL

[72] Inventor: Charles Y. Regat, Redding, Conn.

[73] Assignee: Schlumberger Technology Corporation, New York, N.Y.

[22] Filed: Dec. 29, 1969

[21] Appl. No.: 888,239

[52] U.S. Cl. .................................................. 324/6
[51] Int. Cl. ........................... G01v 3/10, G01v 3/18
[58] Field of Search ................................... 324/6, 8

[56] References Cited

UNITED STATES PATENTS

| | | |
|---|---|---|
| 3,075,142 | 1/1963 | Albright et al.................324/1 |
| 3,179,879 | 4/1965 | Tanguy.........................324/6 |
| 3,259,838 | 7/1966 | Thomsen.......................324/6 |
| 3,487,294 | 12/1969 | Youmans et al..............324/6 |

Primary Examiner—Gerard R. Strecker
Attorney—Stewart F. Moore, Jerry M. Presson, Edward M. Roney, William R. Sherman, Ernest R. Archambeau, David L. Moseley, Michael J. Berger and James C. Kesterson

[57] ABSTRACT

In accordance with an illustrative embodiment of the present invention, methods and apparatus are disclosed for measuring the average conductivity and heterogeneity of formations surrounding a borehole. To accomplish this, certain phase components of the electrical signal produced by an induction logging tool are measured and combined in accordance with given mathematical relationships to produce indications of the average conductivity and heterogeneity of a formation. Moreover, the average conductivity and heterogeneity indications can in turn be combined to give indications of the conductivity of different radial regions of the formation under investigation. Additionally, to measure these phase components, a technique is disclosed for eliminating the mutual coupling between the transmitter and receiver coils of an induction logging tool. In this technique, the transmitter coil(s) is excited at two different frequencies and the mutual coupling component of the voltage induced in the receiver coil(s) at the lower frequency is used to cancel out the mutual coupling component at the higher frequency. The phase components used for computational purposes are then measured at the higher frequency.

51 Claims, 19 Drawing Figures

INVENTOR.
Charles Y. Regat
BY
Edward M. Roney
ATTORNEY

TWO COIL ARRAY

UNIT GROUND LOOP

UNIT GROUND LOOP

INFINITELY LONG CYLINDER

INFINITELY EXTENDING VERTICAL INCREMENT OF FORMATION

PATENTED DEC 12 1972 3,706,025

INDUCTION LOGGING METHODS AND APPARATUS USING MORE THAN ONE PHASE COMPONENT OF THE RECEIVED SIGNAL

This invention relates to electrical methods and apparatus for investigating subsurface earth formations traversed by a borehole and, particularly, to such methods and apparatus of the induction logging type wherein a coil system is utilized to investigate the electrical resistance properties of such subsurface formations.

Induction logging investigations of a borehole drilled into the earth are made by moving a suitable coil system through the borehole. Such a coil system commonly includes one or more transmitter coils and one or more receiver coils, the coils being mounted on a suitable support member is a fixed spatial relationship relative to one another. The transmitter coil or coils are energized with alternating current to induce a secondary current flow in the adjacent formation material. The electromagnetic field resulting from this secondary current flow induces a voltage signal in the receiver coil or coils. This voltage signal varies in accordance with the conductivity value of the formation material. In presently used induction logging systems, only that portion of the receiver voltage which is in-phase with the transmitter current is measured to provide an indication of formation conductivity.

Induction logging systems of this type are discussed in greater detail in a technical paper by H. G. Doll entitled, "Introduction to Induction Logging and Application to Logging of Wells Drilled With Oil Base Mud," which appeared in the June 1949 issue of the Journal of Petroleum Technology. As discussed in this technical paper, if the proper precautions are taken, then the coil system output signal is directly and linearly proportional to the electrical conductivity of the formation material over most of the range of formation conductivity values usually encountered.

However, certain non-linear effects may, under the proper conditions, become of sufficient magnitude to noticeably affect the coil system output signal and cause such signal to vary in a non-linear manner with respect to formation conductivity values. These non-linear effects are caused by the so-called electrical "skin effect" phenomena. This skin effect phenomena results primarily from the mutual interaction with one another of different portions of the secondary current flow in the formation material. The magnitude of this skin effect phenomena increases as the coil system operating frequency increases. It is the same type of phenomena that has been heretofore encountered in the high frequency operation of other types of electrical circuits and devices.

In the case of borehole induction logging apparatus, it has been found that, among other things, the magnitude of this skin effect phenomena is a complicated function of the coil system operating frequency, the effective length of the coil system, and the conductivity value of the adjacent formation material. The last-mentioned factor renders this phenomena particularly objectionable because it tends to produce an extraneous non-linear variation in the output signal. The occurrence of these non-linear variations can be substantially eliminated for a large range of formation conductivity values by proper choice of the coil system operating frequency and the effective coil system length. This, however, places undue restraints on the construction and operation of the coil system and associated circuits. This, in turn, limits other desirable features of the coil system apparatus. For example, it is frequently desired that the coil system be able to accurately determine the conductivity value of the formation material in a region lying at a substantially lateral distance from the borehole. This requires a relatively large coil spacing or coil system length. A large spacing, however, increases the percentage of non-linearity resulting from the occurrence of skin effect. As another example of undesirable restraint, the signal-to-noise ratio of the apparatus can be improved by increasing the operating frequency thereof. This, however, also increases the skin effect non-linearity.

There have been several techniques proposed in the past to correct the conductivity measurements made by induction logging systems for this skin effect non-linearity. In one such system, a function former circuit corrects the apparent conductivity signal derived from the induction logging tool in accordance with a predetermined function. A system of this type can be found in U.S. Pat. No. 3,226,633 granted to W. P. Schneider on Dec. 28, 1965. In another system, the phase-quadrature component of the signal induced into the receiver coil is added to the usual in-phase signal component to produce a conductivity signal corrected for skin effect. This system relies on the principle that the phase-quadrature formation signal is approximately equal to the skin effect component of the in-phase formation signal over a given range of conductivity and frequency values. A system of this type is found in U.S. Pat. No. 3,147,429 granted to James H. Moran on Sept. 1, 1964.

So long as the operating frequency of the system and the conductivity of the ajoining formation are not too large, these prior art systems will provide extremely accurate measurements of formation conductivity for substantially all formation conditions. However, when the product of the frequency and formation conductivity becomes very large, it becomes difficult to obtain an accurate measure of formation conductivity because of the very significant skin effect. Furthermore, if the investigated formation is heterogeneous and the product of the frequency and conductivity is, at the same time large, the problems in obtaining an accurate measure of formation conductivity are compounded.

It is, therefore, an object of the present invention to provide new and improved induction logging methods and apparatus which will enable an accurate measure of formation conductivity under substantially all formation conditions and for a large range of operating frequencies.

When investigating subsurface earth formations with an induction logging device, the formation region that the induction logging device is responsive to will usually consist of a plurality of formation zones having differing conductivities. Thus, for example, if the device is investigating a given formation bed, adjacent formation beds having conductivities different from the bed presently under investigation will contribute to the measurement made by the induction logging device. Furthermore, the zone closer to the borehole is many times filled with a conductive drilling mud which has invaded the formation bed from the borehole. Thus, most of the time, the induction logging device is responsive partly to both the conductivity of the invaded formation zone and the conductivity of the non-invaded formation zone. Moreover, any given formation can contain fractures filled with fluids, which fractures will usually have a conductivity different from the remainder of the formation.

Thus, it can be seen that most formations investigated by an induction logging device are made up of a plurality of regions having different conductivities. Such formations are called heterogeneous as contrasted with a formation having only one conductivity value, which is referred to as a homogeneous formation. Since any single presently used induction logging device produces only one output signal representative of formation conductivity, insofar as this signal is concerned, it can only be assumed that the entire formation region investigated by the induction logging device is homogeneous.

The heterogeneity of formations can be determined to some extent by utilizing a plurality of different investigating devices which investigate different radial formation regions. One such system is shown in U.S. Pat. No. 3,329,889 granted to D. R. Tanguy on July 4, 1967. Additionally, the effects of formation beds adjacent to the particular bed under investigation on the measured conductivity values can be compensated for to some extent by computational techniques such as the one shown in U.S. Pat. No. 3,166,709 granted to H. G. Doll on Jan. 19, 1965. In this Doll system, conductivity measurements made over a given vertical formation interval are memorized and the memorized measurements combined in such a way that the effect of vertical formation regions other than the region under consideration are substantially ignored.

While these prior art techniques have proved satisfactory in the past for measuring and/or compensating for formation heterogeneity under most formation conditions, it would nonetheless be desirable to provide a more accurate measure of formation heterogeneity. It would additionally be desirable to accomplish this without using more than one measuring device and without requiring complicated memory and computing systems.

It is therefore another object of the present invention to provide new and improved induction logging methods and apparatus for measuring the formation heterogeneity.

It is a further object of the present invention to provide new and improved induction logging methods and apparatus which provide a measure of formation heterogeneity as well as a more accurate measure of formation conductivity in homogeneous as well as heterogeneous formations.

In accordance with the present invention, methods and apparatus for investigating earth formations traversed by a borehole comprises producing an electromagnetic field in an earth formation surrounding a borehole and detecting the electromagnetic field to produce an electrical signal representative of the effect of an earth formation on the electromagnetic field. The methods and apparatus further comprise detecting certain phase components of the electrical signal and generating phase component signals representative thereof and using the phase component signals to compute the average conductivity or the heterogeneity of an earth formation. Desirably, a coil array is used to produce the electromagnetic field and the detected phase components are the components of the electrical signal produced in response to the field which are in-phase and in phase-quadrature with the current which energizes the coil array.

To enable computation of the average conductivity and heterogeneity of a formation, the detected phase-quadrature component should represent only the reactive formation current flow and not the mutual coupling between the transmitter and receiver coils. To this end, the coil array can be designed in such a manner as to effectively eliminate this mutual coupling. Alternatively, a fixed phase-quadrature voltage can be subtracted from the receiver coil(s) voltage.

In accordance with another feature of the present invention, methods and apparatus for processing signals derived from an induction logging tool to produce a measure of the average formation conductivity comprises combining the phase component signals to produce a first output signal. The methods and apparatus further comprise forming a non-linear function of the first output signal to produce a second output signal and combining the first and second output signals to produce a third output signal representative of the average conductivity of an earth formation.

In accordance with still another feature of the present invention, methods and apparatus for processing signals derived from an induction logging tool to produce a measure of formation heterogeneity comprises combining the two phase component signals to produce a first output signal and forming a non-linear function of the first output signal to produce a second output signal. The methods and apparatus further comprise combining the first and second output signals to produce a third output signal and combining the third output signal with the phase-quadrature component signal to produce a signal representative of formation heterogeneity.

For a better understanding of the present invention, together with other and further objects thereof, reference is had to the following description taken in connection with the accompanying drawings, the scope of the invention being pointed out in the appended claims.

Referring to the drawings.

Figure 1:
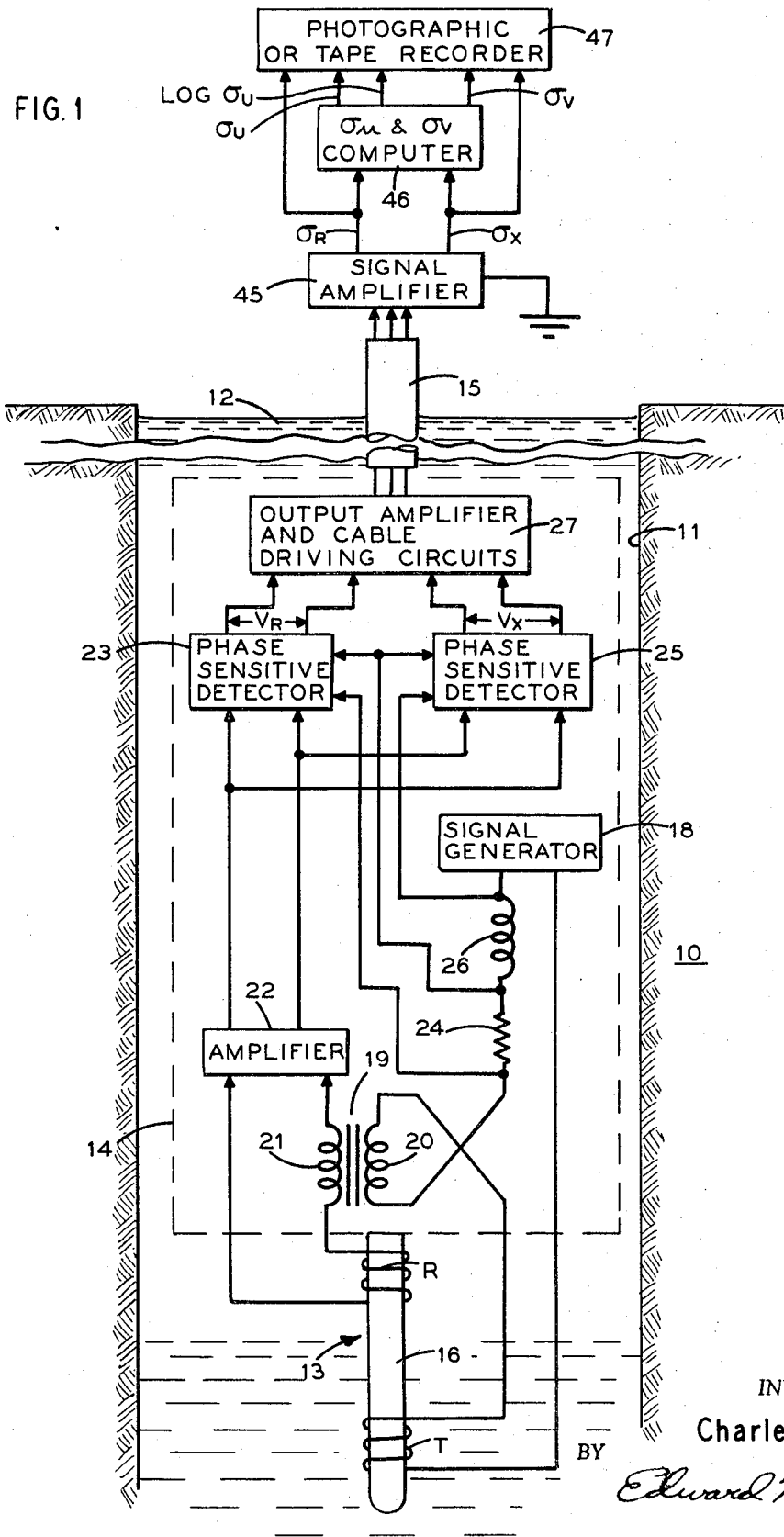
FIG. 1 illustrates in a partially schematic manner a representative embodiment of apparatus constructed in accordance with the present invention.
Figure 2:
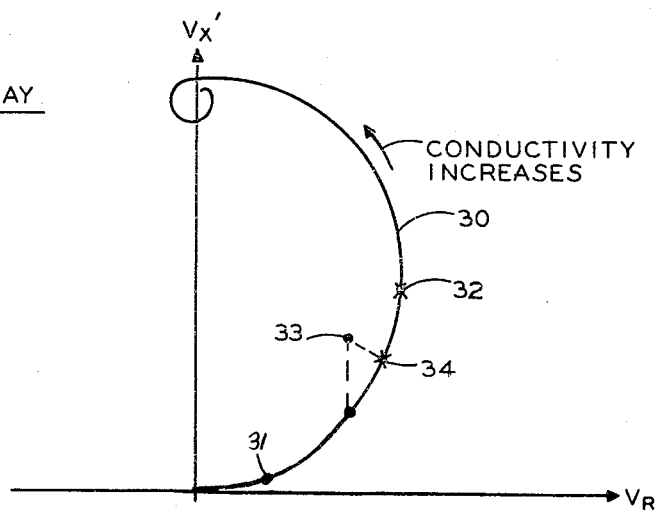
FIGS. 2 and 3 are plots of the in-phase and phase-quadrature components of voltage induced in the receiver coil of an induction logging system for various values of conductivity in a homogeneous formation.
Figure 3:
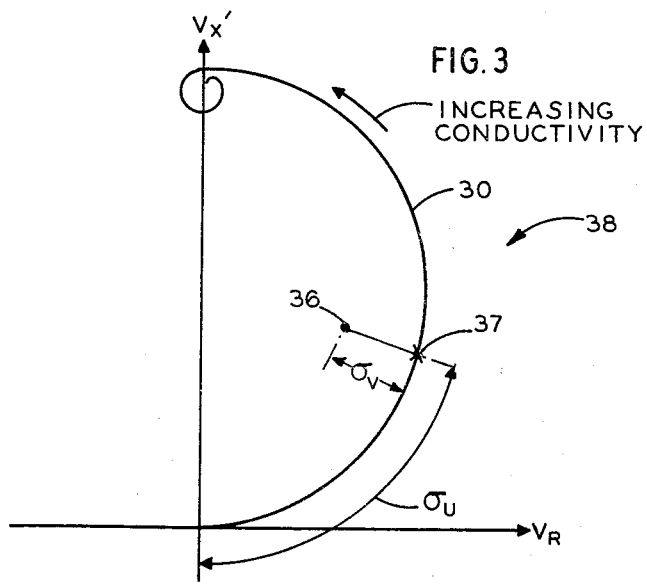
Figure 12:
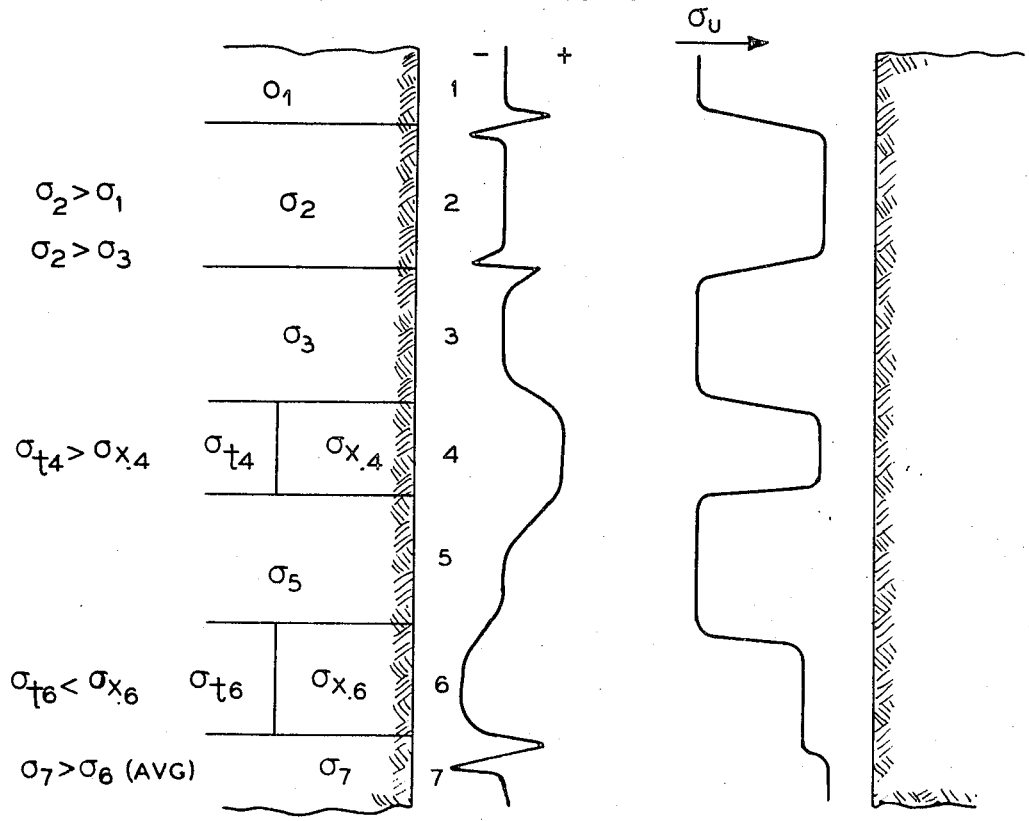
Figure 10:
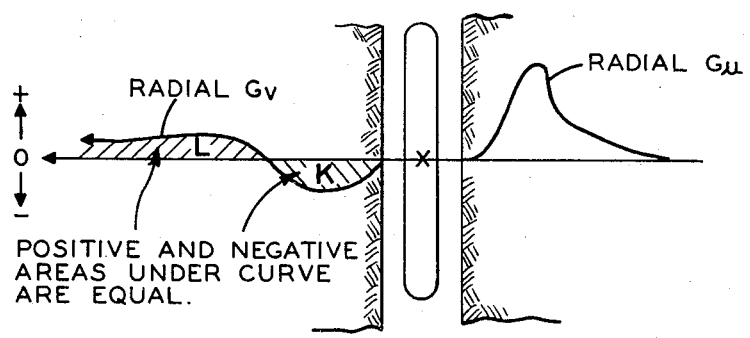
Figure 11:
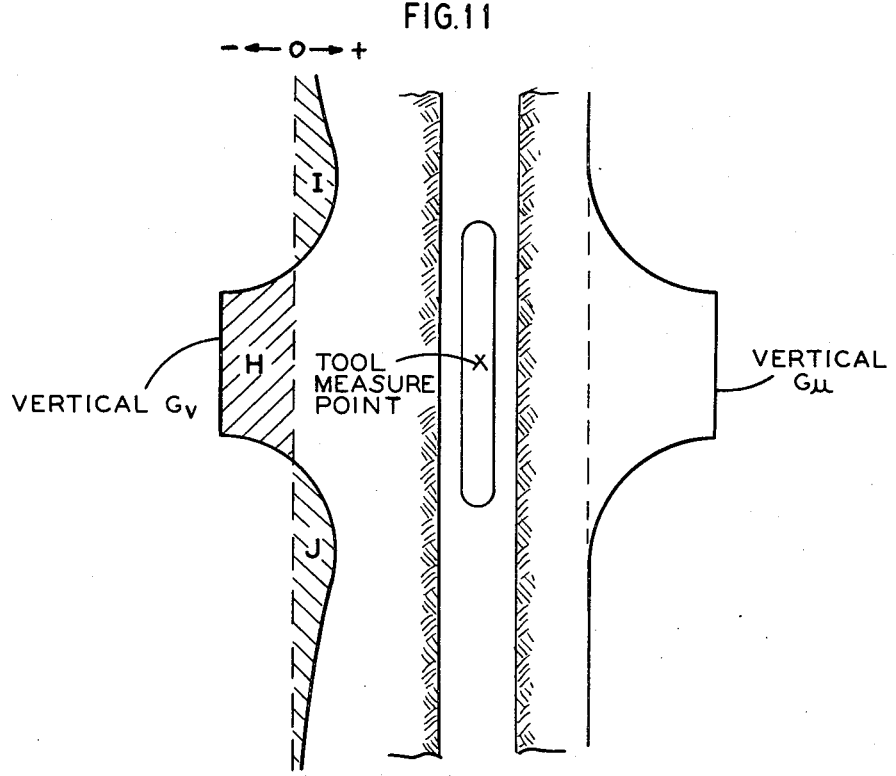
Figure 13:
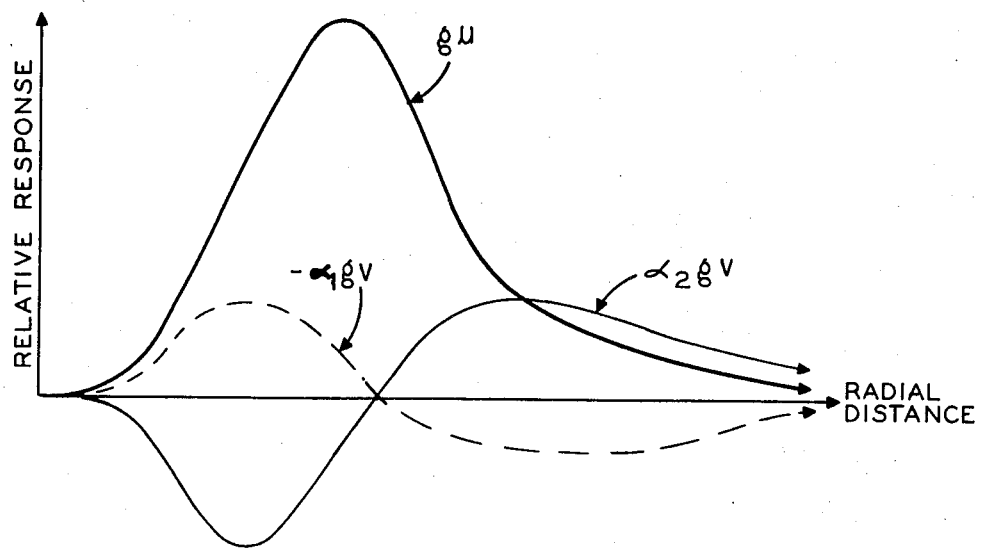
Figure 14:
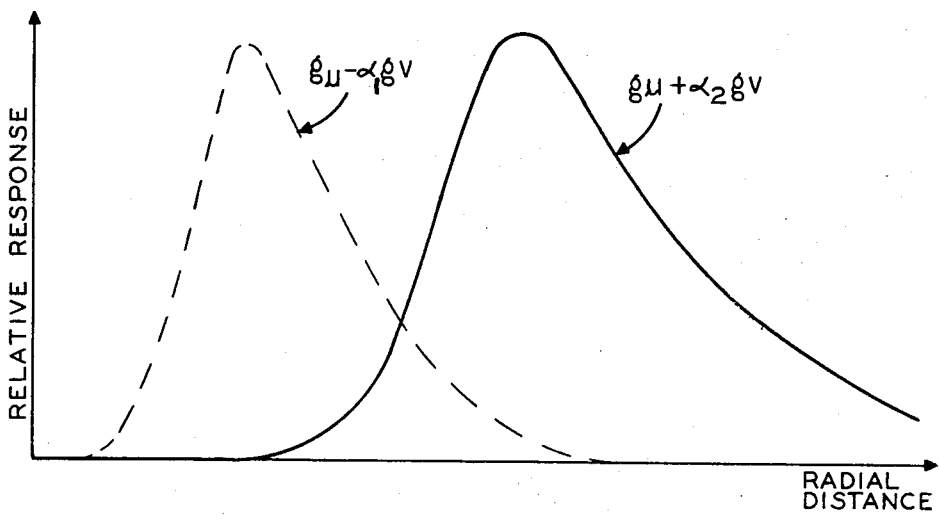
Figure 18:
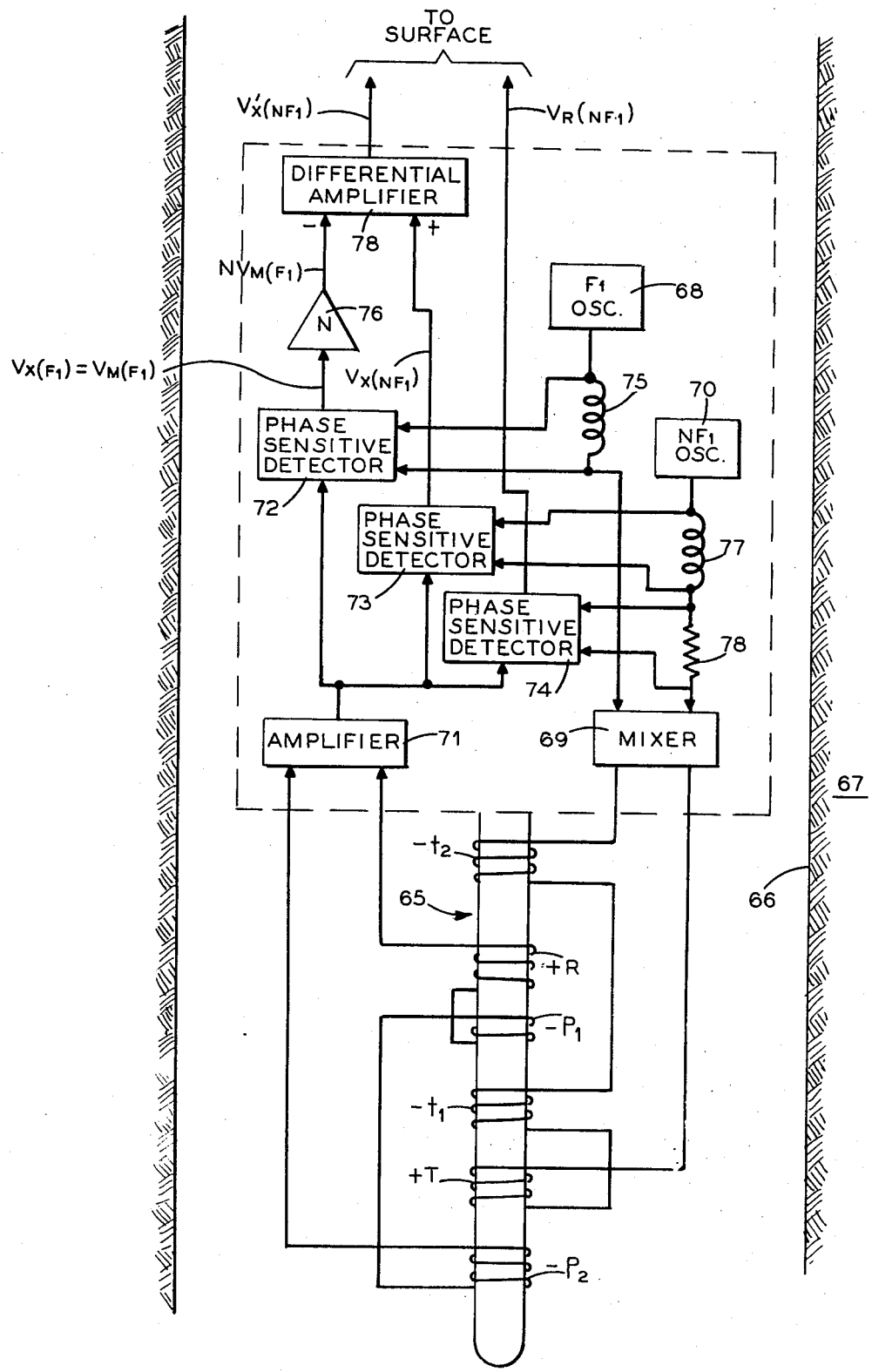
Figure 15:
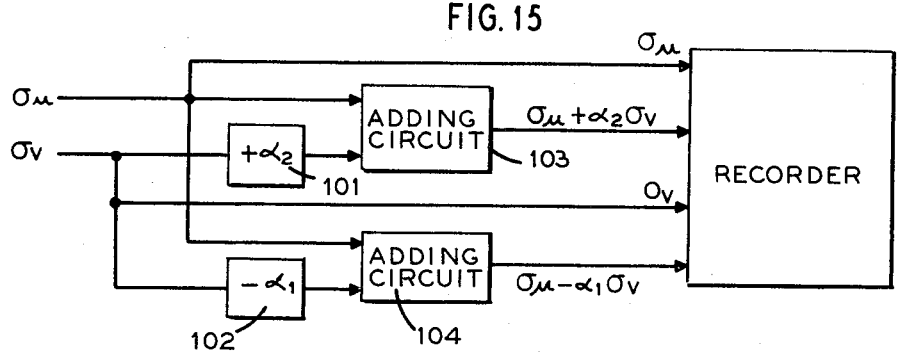
Figure 16:
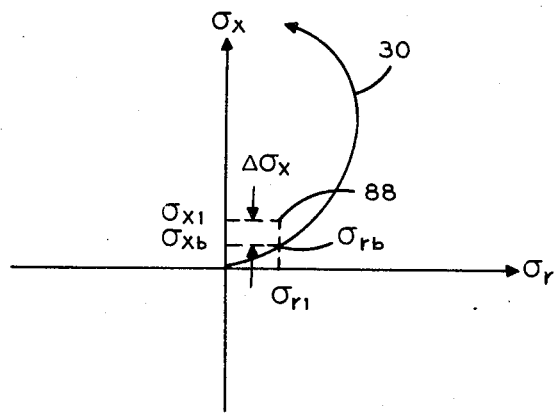
Figure 17:
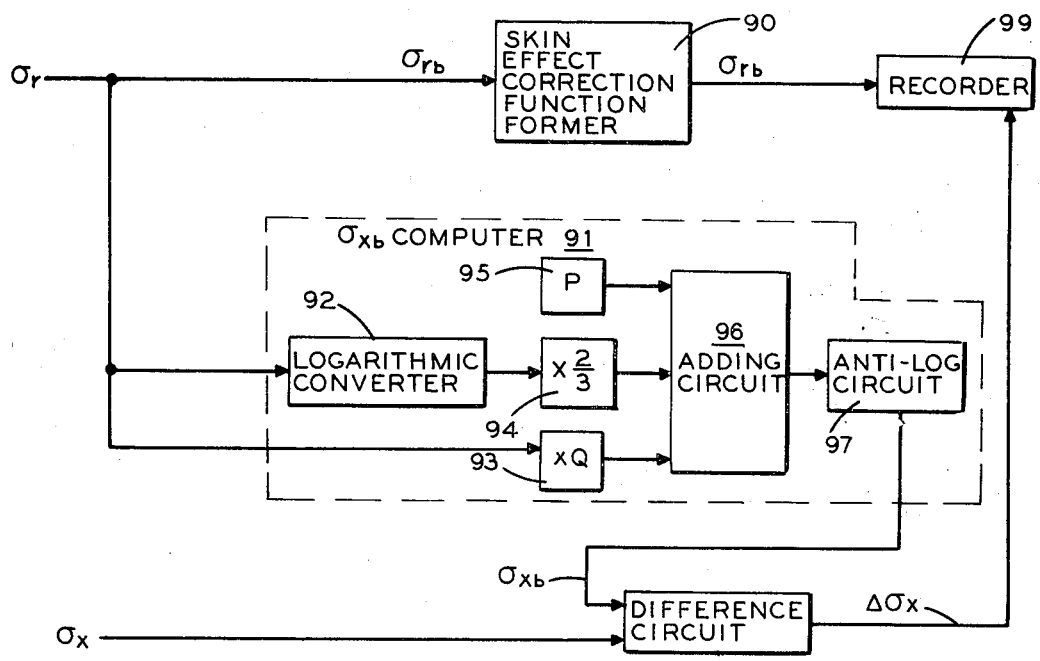

FIGS. 10 and 11 shown a tool in a borehole along with representations of the response of a tool to a formation for several computed parameters produced by the apparatus of FIG. 1 in accordance with the present invention;

FIG. 12 shows typical examples of earth formations along with side-by-side representation of logs of parameters computed by the apparatus of the present invention for each of these typical earth formations;

FIGS. 13 and 14 show plots of the relative response versus radial distance from a borehole for certain computed parameters obtained in accordance with the present invention for purposes of explaining other features of the present invention;

FIG. 15 is a representation of apparatus constructed to practice the techniques depicted in FIGS. 13 and 14;

FIG. 16 is a graph similar to that of FIGS. 2 and 3 for the purpose of explaining certain other features of the present invention;

FIG. 17 shows apparatus constructed to perform the operation depicted in FIG. 16; and FIG. 18 shows another embodiment of apparatus for investigating earth formations in accordance with the present invention.

Referring to FIG. 1 of the drawings, there is shown a representative embodiment of induction logging apparatus constructed in accordance with the present invention for investigating earth formations 10 traversed by a borehole 11. The borehole 11 is usually filled with a drilling liquid or mud 12. The downhole portions of the induction logging apparatus includes a coil system 13 adapted for movement through the borehole 11. The downhole apparatus also includes a fluid-tight instrument housing 14 mechanically attached to the upper end of the coil system 13 for containing the electrical circuits which operate the coil system 13. The instrument housing 14 is in turn suspended from the surface of the earth by an armored multiconductor cable 15. A suitable drum and winch mechanism (not shown) is located at the surface of the earth for raising and lowering the downhole investigating apparatus through the borehole. Also located at the surface of the earth is a power supply (not shown) for supplying electrical energy by way of the cable 15 to the downhole equipment.

The coil system 13 includes a transmitter coil T and a receiver coil R. Both of these coils are wound around a non-conductive, non-magnetic support member 16 so that their center axes are in line with one another and generally parallel to the longitudinal axis of the borehole 11. The longitudinal midpoints of these coils are separated by a distance L.

Within the fluid-tight housing 14 is a signal generator 18 which supplies alternating current I to the transmitter coil T. The flow of this alternating current I in the transmitter coil T serves to induce a voltage signal in the receiver array R which is dependent on the electrical characteristics of the adjacent formation material. In addition to the formation dependent voltage component, there is also induced in the receiver coil R a further voltage component resulting from the direct flux coupling between the transmitter and receiver coils. Consequently, the apparatus of FIG. 1 includes means for canceling the receiver coil voltage component resulting from this direct mutual coupling between the transmitter and receiver coils. This means includes a transformer 19 having a primary winding 20 connected in series in the transmitter energizing current path and a secondary winding 21 connected in series with the receiver coil R. The transformer 19 is connected so that the voltage induced in the secondary winding 21 will be opposite in polarity to the direct coupling voltage component induced in the receiver coil R. The turns ratio for transformer 19 is selected so that this secondary winding voltage is equal in magnitude to the direct coupling voltage component of receiver coil R. Any necessary adjustment of the transformer 21 is conveniently made with the downhole apparatus suspended in air at the surface of the earth and removed from any significant nearby conductive magnetic bodies. Thus, the voltage signal applied to the amplifier 22 will be representative of only the voltage induced in the receiver coil R resulting from the flow of eddy currents in the formation 10.

The downhole apparatus of FIG. 1 includes an amplifier 22 which receives the voltage from the receiver coil R and secondary winding 21. The downhole apparatus also includes a first phase-sensitive detector 23 for developing a unidirectional output signal proportional to that component of the voltage signal from amplifier 22 which is in-phase with the transmitted current I. To develop this output signal, a phase-reference signal developed across a resistor 24 in the transmitter current path is applied to the phase-sensitive detector 23 for this purpose. The FIG. 1 apparatus also includes a second phase-sensitive detector 25 for producing a unidirectional output signal which is proportional to that component of the voltage signal from amplifier 22 which is in phase-quadrature with the transmitter current I. To accomplish this, phase-sensitive detector 25 derives a phase-reference signal developed across an inductor 26. The in-phase and phase-quadrature component voltages, designated $V_r$ and $V_x$, respectively produced by phase-sensitive detectors 23 and 25 are applied to a suitable output amplifier and cable driving circuit 27 for transmission to the surface over conductors in the multiconductor cable 15.

Concerning now the operation of the downhole portions of the FIG. 1 apparatus, the signal generator 18 energizes the transmitter coil T at a constant frequency. The flow of current in the windings of the transmitter coil T produces alternating electromagnetic flux field in the regions surrounding the transmitter coil and extending a substantial distance into the adjacent formation material. This alternating flux field, in turn, serves to induce a secondary current flow in the adjacent formation material. This secondary current, in general, flows around the support member 13 in circular loops which are coaxial with the center axis of the transmitter coil T and thus generally coaxial with the center axis of the borehole 11. The magnitude of this secondary current flow is dependent on the effective electrical impedance of the adjacent formation material. This current flow generally contains both resistive and reactive components.

The flow of secondary current in the adjacent formation material produces an accompanying electromagnetic field which links with the receiver coil R and serves to induce in the receiver coil a corresponding voltage component which is dependent on the electrical characteristics of the adjacent formation material.

There is also induced in the receiver coil R a second voltage component caused by direct flux coupling between the transmitter and receiver coils. This direct coupling voltage component is not dependent on the conductive properties of the adjacent formation material and consequently remains substantially constant throughout the course of investigating the formations surrounding the borehole 11. In the FIG. 1 configuration, this mutual component is canceled by the transformer 19.

From electromagnetic field theory and, in particular, from the theory concerning magnetic dipoles, it can be shown for a pair of coaxial coils located in a homogeneous isotropic medium and spaced apart by a distance greater than the coil dimensions that the relationship of the receiver coil voltage $V$ to the transmitter coil current can be expressed as:

$$V = \frac{-j\omega I \mu A_t A_r}{2\pi L^3}(1-j\gamma L)e^{j\gamma L} \quad (1)$$

where
$\mu$ is the permeability of the medium,
$\omega$ is the radian frequency ($2\pi f$ where $f$ is frequency) of the transmitter current,
$A_t$ is the product of the cross-sectional area times the number of coil turns for the transmitter coil,
$A_r$ is the product of the cross-sectional area times the number of coil turns for the receiver coil,
$L$ is the spacing between coil centers, and
$\gamma$ is the propagation constant of the medium surrounding the coils.

Where the surrounding medium is of a conductive nature, as in the present case, the propagation constant $\gamma$ can be described by the relationship:

$$\gamma = \sqrt{j\omega\sigma\mu} \quad (2)$$

where $\sigma$ is the electrical conductivity of the adjacent medium. Equation (2) can be rewritten as:

$$\gamma = 1 + j1/\delta \quad (3)$$

where $\delta$ is the skin depth in the medium under investigation. This skin depth $\delta$ represents the effective depth of penetration of the electromagnetic field and is defined as:

$$\delta = \sqrt{2/\omega\sigma\mu} \quad (4)$$

Expanding equation (1) by means of a power series and substituting the value of $\gamma$ given by Equation (3) results in the expression:

$$V = \frac{-j\omega\mu I A_t A_r}{2\pi L^3}\left[1+j\left(\frac{L}{\delta}\right)^2 - \frac{2}{3}(1+j)\left(\frac{L}{\delta}\right)^3 + \frac{1}{2}\left(\frac{L}{\delta}\right)^4 - \frac{2}{15}(1-j)\left(\frac{L}{\delta}\right)^5 + \cdots\right] \quad (5)$$

It is seen that Equation (5) contains both real and imaginary terms. Accordingly, Equation (5) is of the form:

$$V = V_r + jV_x \quad (6)$$

$V_r$ denotes the real terms of equation (5) and thus denotes the receiver coil voltage components which are in-phase with the transmitter coil energizing current $I$. These in-phase components result from the resistive component of the formation impedance. $V_x$ corresponds to the imaginary terms of equation (5) and denotes the voltage components induced in the receiver coil $R$ which are in phase-quadrature with the transmitter coil current $I$. These quadrature phase components result from both the direct flux coupling between transmitter and receiver coils and from the reactive component of the formation impedance.

Collecting the real terms of Equation (5), it is seen that:

$$V_r = \frac{\sigma\omega^2\mu^2 I A_t A_r}{4\pi L}\left[1 - \frac{2}{3}\left(\frac{L}{\delta}\right) + \frac{2}{15}\left(\frac{L}{\delta}\right)^3 - \cdots\right] \quad (7)$$

The relationship for the resistive or in-phase voltage given by Equation (7) is of the form:

$$V_r = V_g - V_s \quad (8)$$

where $$V_g = \frac{\sigma\omega^2\mu^2 I A_t A_r}{4\pi L} \quad (9)$$

and $$V_s = V_g\left[\frac{2}{3}\left(\frac{L}{\delta}\right) - \frac{2}{15}\left(\frac{L}{\delta}\right)^3 + \cdots\right] \quad (10)$$

The $V_g$ term given by Equation (9) denotes the so-called "geometrical factor" signal predicted by the linear theory set forth in the previously mentioned technical paper by H. G. Doll. As indicated by Equation (9), the only variable is the formation conductivity factor $\sigma$. Thus, this geometrical factor signal $V_g$ is directly and linearly proportional to the conductivity $\sigma$ of the adjacent formation material.

The remaining terms of Equation (7) represent non-linear in-phase components and are denoted by the symbol $V_s$ given by Equation (10). It can be seen from Equation (7) that this skin effect term distracts from the total $V_r$ signal in a non-linear manner relative to the formation conductivity value.

Considering now the reactive or quadrature phase component of the total signal of Equation (5), these components are represented by the imaginary terms of Equation (7). Collecting these imaginary terms gives:

$$V_x = \frac{\omega\mu I A_t A_r}{2\pi L^3}\left[-1+\frac{2}{3}\left(\frac{L}{\delta}\right)^3 - \frac{1}{2}\left(\frac{L}{\delta}\right)^4 \frac{2}{15} + \left(\frac{L}{\delta}\right)^5 - \cdots\right] \quad (11)$$

Equation (11) is of the form:

$$V_x = V_m + V_x' \quad (12)$$

where $$V_m = \frac{\omega\mu I A_t A_r}{2\pi L^3} \quad (13)$$

and $$V_x' = \frac{\omega\mu I A_t A_r}{2\pi L^3}\left[\frac{2}{3}\left(\frac{L}{\delta}\right)^3 - \frac{1}{2}\left(\frac{L}{\delta}\right)^4 + \frac{2}{15}\left(\frac{L}{\delta}\right)^5 - \cdots\right] \quad (14)$$

The $V_m$ term denotes the voltage component resulting from direct flux coupling between the transmitter and receiver coils and, as indicated by Equation (13), is not dependent on the conductivity of the adjacent formation material. In the FIG. 1 apparatus, this direct coupling component $V_m$ is canceled out through the action of the transformer 19 and need not be considered further.

The $V_x'$ term of Equation (12) denotes the quadrature component resulting from the reactive component of the secondary current flow in the adjacent formation material. As indicated by the $\delta$ factors of Equation (14), its magnitude is dependent on the conductivity of the formation material.

Combining Equations (7) and (14), the receiver voltage $V_x'$ after the mutual component $V_m$ is canceled, is:

$$V = V_r + jV_x' = \frac{\sigma\omega^2\mu^2 I A_t A_r}{4\pi L}\left(1 - \frac{2}{3}\left(\frac{L}{\delta}\right) - \frac{2}{15}\left(\frac{L}{\delta}\right)^3 + \cdots\right)$$
$$+ j\left[\frac{\omega\mu I A_t A_r}{2\pi L^3}\left(\frac{2}{3}\left(\frac{L}{\delta}\right)^3 - \frac{1}{2}\left(\frac{L}{\delta}\right)^4 + \frac{2}{15}\left(\frac{L}{\delta}\right)^5 - \cdots\right)\right]$$
(15)

Turning now to FIG. 2, there is shown a plot of $V_r$ versus $V_x'$ for a two coil array in a homogeneous formation over a range of conductivity values. In FIG. 2, the values of conductivity increase in a counterclockwise direction along the solid line curve 30 of FIG. 2.

Initially, induction logging equipment was operated at such a low frequency that for most conductivity values of interest, the received voltage V was proportional to conductivity. Why this is so can be seen by inspecting Equations (4), (9), (10), and (14). From Equation (4), it can be seen that when the radian frequency $\omega$ is low, the skin depth $\delta$ will be large and thus the skin effect voltage component $V_s$ given by equation (10) and the formation quadrature component $V_x'$ given by Equation (14) will both be negligible leaving only the geometrical factor voltage component $V_g$ of Equation (9). Looking at FIG. 2, the effect of decreasing the frequency is to compress the entire curve 30 assuming that the $V_r$ and $V_x'$ scales remain the same. However, assume for the moment that the $V_r$ and $V_x'$ scales are expanded to the point where the new conductivity curve overlaps the original curve 30, the conductivity point 34 will be moved to the new position 31. It can be seen that with this lower frequency, that most conductivity values of interest will be on that portion of the curve near the $V_r$ axis.

However, when utilizing such a low operating frequency, the signal-to-noise ratio decreases by a considerable factor. This can be seen from Equation (9) since the induced voltage component $V_g$ is proportional to the square of the frequency $\omega$. Consequently, if the operating frequency is increased to a level which would make the in-phase skin effect voltage $V_s$ and phase-quadrature formation voltage component $V_x'$ important, a curve similar to the curve 30 of FIG. 2 would result. To produce an accurate measure of formation conductivity at these relatively high operating frequencies, it has been found necessary to introduce a skin effect correction to the in-phase receiver coil voltage $V_r$ to arrive at accurate values of formation conductivity $\sigma$. This correction takes the form of boosting the level of the in-phase receiver voltage $V_r$ by a prescribed amount for given values of this voltage $V_r$. Since skin effect affects the received voltage $V_r$ in a non-linear fashion as seen from Equations (10) and (14), this skin effect correction takes the form of a non-linear boosting of the receiver voltage $V_r$ to arrive at corrected values of conductivity. It has been found that the conductivity measured by such a system with skin effect correction is reasonably accurate for a great many values of formation conductivity.

However, consider the case where formation conductivity is so high that significant changes in conductivity will produce little or no change in the in-phase voltage component $V_r$, as represented by the point 32 on the conductivity curve 30 of FIG. 2. Since, in presently used induction logging systems, only the in-phase component $V_r$ of the receiver voltage is measured, the same value of conductivity will be measured for all actual formation conductivity values along the vertical portion of the curve 30. Moreover, as formation conductivity increases beyond this vertical portion of the curve 30, an ambiguity takes place in that the same value of in-phase receiver voltage $V_r$ will result from two different values of formation conductivity. Thus, when measuring just the in-phase component of the receiver voltage, the range of formation conductivities which can be measured is limited.

As stated earlier, most formations are not homogeneous in nature and thus, in FIG. 2, values of formation conductivity for such heterogeneous formations would not fall on the homogeneous formation conductivity curve 30. For relatively low values of formation conductivity, this difference would not be too important since the slope of the curve 30 at such low conductivity values is reasonably close to zero. However, consider the situation where a give heterogeneous formation has values of $V_r$ and $V_x'$ such as to give the point 33 in FIG. 2. In the prior art systems, since only the in-phase voltage component $V_r$ is measured, it would be assumed that the formation conductivity value measured is the vertical projection of this point 33 onto the homogeneous conductivity curve 30. In actuality, a more representative value of average formation conductivity would be the conductivity value on the curve 30 which is closest to the plotted point 33 such as the point 34. As stated earlier, inaccuracies arising from heterogeneous formations can be corrected for to some extent by using multiple measuring devices and complicated computational techniques.

In accordance with the present invention, values of both the in-phase component $V_r$ and the phase-quadrature component $V_x'$ of the receiver voltage are measured and utilized to obtain measurements which are not only more accurately indicative of formation conductivity for most cases but are also indicative of the degree of formation heterogeneity. To accomplish this, in accordance with the present invention, it is assumed that the formation conductivity parameter $\sigma$ used in Equation (1) (as combined with Equation (2)) is a complex number having both real and imaginary components. These real and imaginary conductivity components are designated $\sigma_u$ and $\sigma_v$ respectively such that the complex conductivity $\sigma_c$ can be represented as:

$$\sigma_c = \sigma_u + j\sigma_v \quad (16)$$

Combining Equations (1), (2) and (16):

$$V = V_r + jV_x$$
$$= \frac{-j\omega I \mu A_t A_r}{2\pi L^3}\left(1 - jL\sqrt{j\omega\mu(\sigma_u + j\sigma_v)}\,e^{jL\sqrt{j\omega\mu(\sigma_u + j\sigma_v)}}\right)$$
(17)

Referring to FIG. 3, there is shown the curve 30 of FIG. 2 reproduced for purposes of explaining what $\sigma_u$ and $\sigma_v$ represent. In this connection, it would be best to take some specific examples. Thus, assume that the values of $V_r$ and $V_x'$ are such as to give the plotted point 36 of FIG. 3. If a line is drawn from this plotted point 36 to the nearest point thereto on the curve 30 (and thus perpendicular to the curve 30), the distance between the point 36 and the curve 30 is representative of the value of $\sigma_v$ and thus can be calibrated in terms of values of $\sigma_v$. The distance between the initial point of the curve 30 at $V_r$, $V_x' = 0$ to the intersecting point 37 is representative of the value of $\sigma_u$ and thus can be calibrated in terms of $\sigma_u$.

From the above, it can be seen that the chosen value of $\sigma_u$ is the point on conductivity curve 30 that is closest to the plotted point 36. Thus, $\sigma_u$ will be representative of an average value of formation conductivity of the formation region under investigation. Thus, the average conductivity $\sigma_u$, as the term is used here, represents the conductivity of that homogeneous formation which more nearly corresponds with the formation under investigation than any other homogeneous formation.

Concerning the significance of $\sigma_v$, if the plotted point given by the values of $V_r$ and $V_x'$ falls inside the conductivity curve 30 as represented by point 36, $\sigma_v$ is positive and the value of formation conductivity near the coil array is less than the conductivity in those regions further away from the coil array. Conversely, if $\sigma_v$ falls outside the homogeneous conductivity curve 30 as represented by the point 38, $\sigma_v$ is negative and the near region conductivity is greater than the far region conductivity. Thus, the polarity of $\sigma_v$ indicates the distribution of conductivity in the formation. It should be apparent that the distance between the point 38 and the nearest point on the homogeneous conductivity curve 30 is representative of the degree of heterogeneity. Thus, with $\sigma_v$, it is possible to determine the heterogeneity, i.e., the relative conductivities of the near and far formation regions (vertically and radially) by observing the magnitude and polarity of the computed parameter $\sigma_v$.

In homogeneous formations, the value $\sigma_v$ would be equal to zero since the values of $V_r$ and $V_x'$ would give a point which falls on the homogeneous conductivity curve and the value of $\sigma_u$ measured will be determined by the distance or the length of the curve from the origin ($V_r = V_x' = 0$) to the plotted $\sigma_v$ point.

The discussion up to this point has been concerned with a simple two-coil array. It is well known that by utilizing a plurality of transmitter and receiver coils, an improved response of the coil array to the adjacent formation material can be obtained, i.e., improved radial and vertical geometrical factors can be obtained. The techniques of the present invention can also be applied to the signals derived from such multicoil arrays.

To evaluate such a multicoil array, it is merely necessary to examine each transmitter and receiver coil pair as an individual two-coil array and combine the response of each such two-coil arrays. Thus, rewriting Equation (17) for a multicoil array:

$$V_r + V_{x'} = \Sigma \frac{j\omega I \mu A_{t_m} A_{r_n}}{2\pi L_{mn}^3} e^{j\gamma L_{mn}}(1 - j\gamma L_{mn}) \quad (18)$$

where $A_{t_m}$ is the product of the cross-sectional area and the number of coil turns for the $m^{th}$ transmitter coil, $A_{r_n}$ is the product of the cross-sectional area and the number of coil turns for the $n^{th}$ receiver coil, $L_{m_n}$ is the spacing between the coil centers of the $m^{th}$ transmitter coil and the $n^{th}$ receiver coil, and $$\gamma = \sqrt{j\omega\mu(\sigma_u + j\sigma_v)}$$

If Equation (18) was rewritten for conductivity $\sigma$ instead of receiver voltage V, the righthand side of the Equation (18) should be divided by $$\Sigma \frac{I\omega^2\mu^2}{4\pi} \frac{A_{t_m}A_{r_n}}{L_{mn}}$$

to normalize the expression. Thus, we can write $$\sigma = \sigma_r + j\sigma_x = \frac{\Sigma \frac{A_{t_m}A_{r_n}}{L_{mn}} \frac{2}{\omega\mu L_{mn}^2} e^{j\gamma L_{mn}}(1 - j\gamma L_{mn})}{\Sigma \frac{A_{t_m}A_{r_n}}{L_{mn}}}$$

(19)

(Note: for simplicity, the prime notation has been dropped from $\sigma_x$ but, nonetheless, $\sigma_x$ corresponds to $V_x'$.) Equations (18) or (19) can then be solved for $\sigma_u$ and $\sigma_v$ in the same manner as Equation (1) was solved for the same parameters for a two-coil arrangement. Equations (18) and (19) are generalized expressions and are pertinent to all coil arrays, including a two-coil array.

Figure 3A:
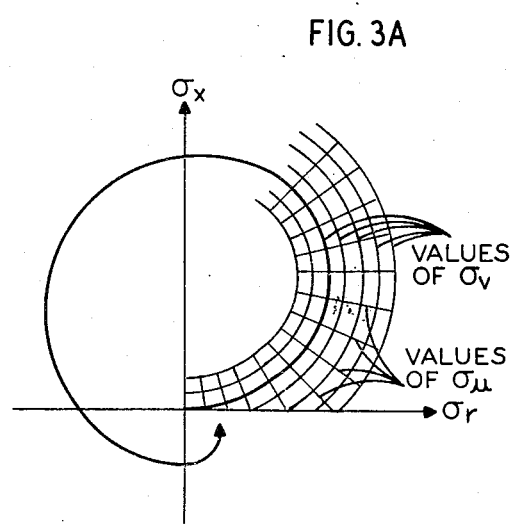
FIG. 3A is a plot of certain computed parameters as a function of in-phase and phase-quadrature conductivity.

Equation (19) can be used to produce a grid giving values of $\sigma_u$ and $\sigma_v$ as a function of $\sigma_r$ and $\sigma_x$. This can be accomplished, for example, by selecting values of $\sigma_u$ and $\sigma_v$ and solving for the corresponding values of $\sigma_r$ and $\sigma_x$. A typical grid produced by such computations is shown in FIG. 3A. FIG. 3A is a plot of $\sigma_r$ versus $\sigma_x$ for a multicoil array.

From an inspection of FIG. 3A in conjunction with the foregoing, it can be seen that when transforming values of $V_r$ and $V_x'$ (or $\sigma_r$ and $\sigma_x$) into values of $\sigma_u$ and $\sigma_v$, families of orthogonal curves in a rectangular system of axes are transformed into corresponding families of orthogonal curves in a system of axes in which the families of curves are curvilinear relative to the rectangular system of axes. Thus, in FIGS. 3 or 3A, the axes $\sigma_r = 0$, $\sigma_x = 0$ are rectangular and all curves ($\sigma_r$ and $\sigma_x$ = any value) are also rectangular. Moreover, the curves defining $\sigma_u$ and $\sigma_v$ are orthogonal and are both curvilinear when referenced to the system of axes for $\sigma_r$ and $\sigma_x$.

In using the teachings of the present invention in practice, $\sigma_r$ and $\sigma_x$ will be measured with an exploring device lowered into the borehole and some technique must be employed to obtain $\sigma_u$ and $\sigma_v$ from such measured values of $\sigma_r$ and $\sigma_x$. Such a conversion technique can be as complicated or as simple as desired. For example, measured values of $V_r$ and $V_x'$ could be used in conjunction with the grid of FIG. 3A to obtain values of $\sigma_u$ and $\sigma_v$. Alternatively, a grid like the grid of FIG. 3A applied to any exploring device could be used to construct a table of values of $\sigma_u$ and $\sigma_v$ for any given values of $\sigma_r$ and $\sigma_x$. Such a table could be used manually or used to write a table look-up computer program. (How to implement a table look-up computer program is well known.)

As an alternative, a curve fitting technique could be utilized to come up with expressions which approximate Equation (19). Depending on how closely Equation (19) is to be approximated, the expressions can be as complicated or as simple as desired. It has been found that the following expressions approximate to a reasonable degree the values of $\sigma_u$ as a function of $V_r$ and $V_x'$:

$$\text{Log } \sigma_u = C + A \text{ Log } \sigma_1 + B\sigma_1 + D\sigma_1^2 + \ldots$$
$$+ A_1 \text{ Log } \sigma_1' + B_1\sigma_1' + D_1(\sigma_1')^2 + . \quad (20)$$

where
$$\sigma_1 = aV_r + bV_x' \text{ and}$$
$$\sigma_1' = a'V_r + b'V_x' \quad (21)$$

The expression for $\sigma_v$ is:
$$\text{Log } \sigma_2 = C' + A' \text{ Log } \sigma_1 + B'\sigma_1 + D'\sigma_1^2 + \ldots$$
$$+ A_1' \text{ Log } \sigma_1' + B_1'\sigma_1' + D_1'(\sigma_1')^2 + . \quad (22)$$

$$\sigma_v = eV_x' - d\sigma_2 \quad (23)$$

The factors $a$ to $e$, $A$, $B$, $C$, $D$, $A'$, $B'$, $C'$, $D'$, $A_1'$, $B_1'$, $D_1'$ are constants related to the design of the coil array and which are determined in the curve fitting process.

Figure 4:
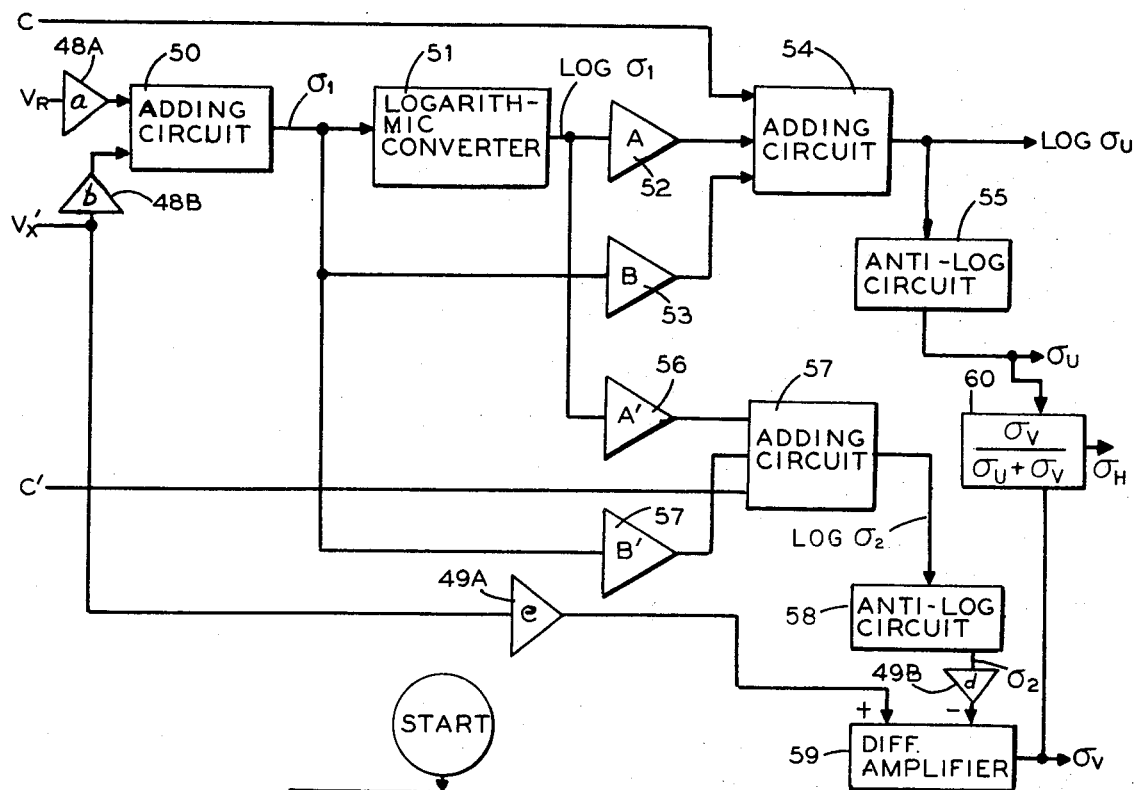
FIG. 4 shows the computer section of the apparatus of FIG. 1 in greater detail.

Now turning to FIG. 4, there is shown a typical example of how the $\sigma_u$ and $\sigma_v$ computer 46 of FIG. 1 can be constructed. In the FIG. 4 computer, only the first three terms of Equations (20) and (22) are considered. However, it is to be understood that the computer could be constructed to accommodate as many terms as desirable or necessary. The $V_r$ and $V_x'$ signals derived from the downhole investigating apparatus are applied to an adding circuit 50 by way of weighting circuits 48a and 48b which give the weighting factors $a$ and $b$. The adding circuit 50 combines these two quantities $aV_r$ and $bV_x'$ to produce an output signal designated $\sigma_1$ in accordance with Equation (21). The output signal $\sigma_1$ is applied to the logarithmic converter 51 to produce an output signal proportional to the logarithm of $\sigma_1$. This output signal from logarithmic converter 51 is applied to a weighting circuit 52, which applies the multiplying factor $A$ of Equation (18) to the quantity log $\sigma_1$ to produce an output signal proportional to A Log $\sigma_1$. This output signal from weighting circuit 52 along with a signal proportional to the constant $C$ of Equation (20) and a factor $B\sigma_1$ are applied to an adding circuit 54 which produces an output signal proportional to Log $\sigma_u$ in accordance with Equation (20). The quantity $B\sigma_1$ is derived from a weighting circuit 53 which receives the signal proportional to $\sigma_1$ from adding circuit 50 and weights it by the factor $B$. The function Log $\sigma_u$ can also be converted to a linear function of $\sigma_u$ by utilization of an anti-log circuit 55.

To produce the function $\sigma_v$, the function Log $\sigma_1$ is weighted by the factor $A$ in a weighting circuit 56 and applied to an adding circuit 57. Additionally, the function $\sigma_1$ is weighted by the factor $B'$ in a weighting circuit 57 and applied to the adding circuit 57. The factor $C'$ is also applied to the adding circuit 57 such that the output signal from adding circuit 57 will be proportional to Log $\sigma_2$ in accordance with Equation (23). The function Log $\sigma_2$ is converted to $\sigma_2$ by an anti-log circuit 58 and applied to the subtracting input of a differential amplifier 59. The phase-quadrature formation signal $V_x'$ is applied to the positive input of the differential amplifier 59 such that the output signal therefrom will be proportional to $\sigma_v$ in accordance with Equation (22). If desired, the heterogeneity term could be normalized to account for variations in formation conductivity $\sigma_u$. To accomplish this, $\sigma_v$ could be divided by $\sigma_u$, or better yet, by $\sigma_u + \sigma_v$ as represented by the circuit 60 in FIG. 4.

Alternatively, Equations (17) or (19) could be solved by a digital computer for each measured value of $V_r$ and $V_x'$ or $\sigma_r$ and $\sigma_x$ to produce indications of $\sigma_u$ and $\sigma_v$. This could be accomplished, for example, by an iterative method. Thus, different values of $\sigma_u$ and $\sigma_v$ could be inserted in Equations (17), (18) or (19) until the values of $V_r$ and $V_x'$ or $\sigma_r$ and $\sigma_x$ produced by Equations (17) or (19) equals the measured values of $V_r$ and $V_x'$ or $\sigma_r$ and $\sigma_x$.

Figure 5:
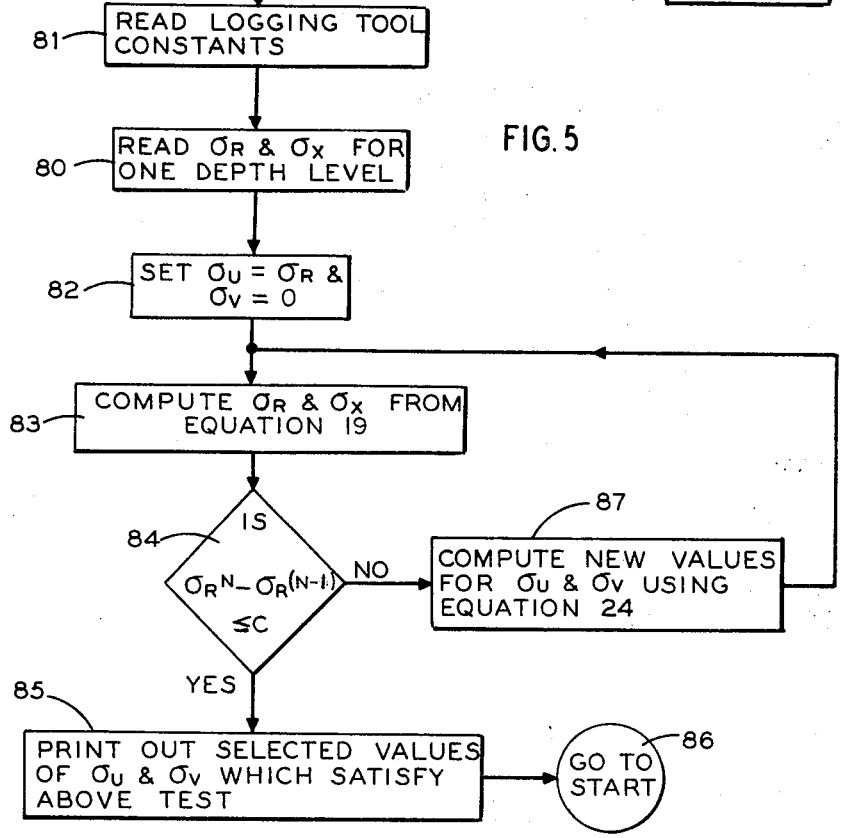
FIG. 5 illustrates a flow diagram which could be used to program a general purpose digital computer for computing certain formation parameters.

To this end, turning to FIG. 5, there is shown a flow diagram representing a computer program which solves for $\sigma_u$ and $\sigma_v$ as a function of $\sigma_r$ and $\sigma_x$. After the program "start," the measured conductivity parameters for one depth level as well as the logging tool constants are read into the computer, as represented by the processing blocks 80 and 81 respectively. Then, as a first approximation, $\sigma_u$ is set equal to $\sigma_r$ and $\sigma_v$ is set equal to zero, as represented by the processing block 82. This first approximation therefore assumes a homogeneous formation. Next, Equation (19) is solved for $\sigma_r$ and $\sigma_x$ using these assumed values of $\sigma_u$ and $\sigma_v$, as represented by the processing block 83.

There are any number of tests that could be made to determine if $\sigma_u$ and $\sigma_v$ are reasonably accurate. One such test is to determine the difference between one or both of the measured quantities $\sigma_r$ and/or $\sigma_x$ and the computed values thereof made using the assumed values for $\sigma_u$ and $\sigma_v$. In this case, as represented by the decision block 84, a test is made to determine if the new computed value $\sigma_r^n$ differs from the previous value of $\sigma_r$ (designated $\sigma_r^{n-1}$ which is initially the measured value of $\sigma_r$) by a factor less than a selected quantity $C$. If the answer is yes, the assumed values of $\sigma_u$ and $\sigma_v$ are printed out and the program returns to "start" to consider the next depth level, as represented by the elements 85 and 86. If the test of decision block 84 was not satisfied, new values of $\sigma_u$ and $\sigma_v$ are selected and the same process is performed again, as represented by the processing block 87 and its output to the input of processing block 83. During the second iteration, the presently computed value of $\sigma_r$, designated $\sigma_r^n$, will be compared with the last computed value thereof, designated $\sigma_r^{n-1}$. Thus, the decision element 84 checks to determine if the computed values of $\sigma_r$ are changing significantly from one iteration to the next, and if they are not, the last selected values of $\sigma_u$ and $\sigma_v$ are outputed as the final values.

To determine what the new values of $\sigma_u$ and $\sigma_v$ should be, the ratio of the measured value of $\sigma_r + j\sigma_x$ to the computed value thereof is computed and multiplied times the last assumed values of $\sigma_u$ and $\sigma_v$. The equation expressing this selection of new $\sigma_u$ and $\sigma_v$ values is:

$$\sigma_u^{(n+1)} + j\sigma_v^{(n+1)} = \frac{\sigma_r + j\sigma_x}{\sigma_r^n + j\sigma_x^n}(\sigma_u^n + j\sigma_v^n) \quad (24)$$

where the designation $n+1$ refers to a new parameter to be used in the next computation and the designation $n$ refers to a parameter just computed. The equation expressing the function performed by the decision block 84 is:

$$\sigma_r^n - \sigma_r^{(n-1)} \leq C \quad (25)$$

where $n-1$ represents the value of $\sigma_r$ obtained prior to the present computation n (initially, it represents the measured value of $\sigma_r$), and $C$ is any desired quantity.

Summarizing this operation, values of $\sigma_r$ and $\sigma_x$ are read at each depth level and $\sigma_u$ and $\sigma_v$ are initially set equal to $\sigma_r$ and zero respectively. Equation (19) is then solved for $\sigma_r$ and $\sigma_x$. If this computed value of $\sigma_r$, i.e., $\sigma_r^n$ does not satisfy Equation (25), the program calculates new values for $\sigma_u$ and $\sigma_v$ in accordance with equation (24). These new values of $\sigma_u$ and $\sigma_v$ are then used to compute new values of $\sigma_r$ and $\sigma_x$ and the new computed value of $\sigma_r$ (and/or $\sigma_x$) is checked against the last computed value of $\sigma_r$(and/or $\sigma_x$) in accordance with Equation (25). Again, if Equation (25) is not satisfied, new values of $\sigma_u$ and $\sigma_v$ are again computed in accordance with Equation (24) and the process repeats itself. This process continues over and over again until Equation (25) is finally satisfied, at which time the last computed values of $\sigma_u$ and $\sigma_v$ are printed out and the program proceeds to the next depth level.

It would perhaps be helpful now to discuss the concept of the present invention in terms of the so-called "geometrical factor" theory. In this connection, it would be desirable to briefly summarize this geometrical factor theory before discussing the geometrical factors for $\sigma_u$ and $\sigma_v$. In the previously mentioned Doll paper, it was set forth that a unit ground loop of radius $r$ and situated at an altitude $z$ with respect to the center point of the coil system contributed to the total geometrical factor signal $V_g$ an elementary signal $e$ given by:

$$e(r,z) = Kg(r,z)\sigma(r,z) \quad (26)$$

where $\sigma(r,z)$ is the conductivity of the unit ground loop at the point $r,z$ and $K$ an apparatus constant given by:

$$K = \omega^2\mu^2 I A_t A_r / 4\pi L \quad (27)$$

Figure 6:
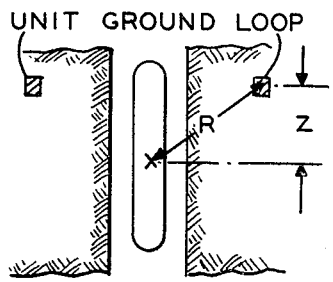
FIGS. 6–9 show a well tool in a borehole along with various geometrical portions of a formation for purposes of defining a number of technical terms.

The factors 107, $A_t$, $A_r$, $I$ and $L$ have been previously defined. A unit ground loop is defined as a horizontal loop of homogeneous ground, having a circular shape with its center on the axis of the hole, and whose cross-section is a very small square of unit area. Such a loop is represented in FIG. 6.

The factor $g$ depends exclusively on the geometry, that is, on the dimension and position of the unit loop. For that reason, it is referred to as the unit geometrical factor of the unit loop. The total geometrical factor signal will then be the summation of the voltage components given by Equation (26) for each unit loop within the response region of the investigating coil system. Thus, the relationship for $V_g$ in terms of this geometrical factor theory is:

$$V_g = K \int\int g(r,z)\sigma(r,z)\,dr\,dz \quad (28)$$

Figure 7:
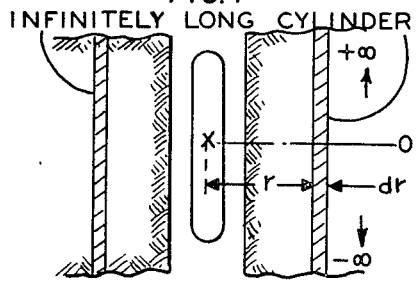

In a formation bed of great thickness which is invaded laterally by mud fluid, the conductivity will not vary along the vertical (parallel to the borehole) but will vary as a function of radial distance from the borehole axis. Such a medium can be considered as a combination of a large number of cylinders coaxial with the borehole and which are individually homogeneous but whose conductivity may vary from one cylinder to another. Thus, dividing this medium into an infinite number of cylindrical shells coaxial with the borehole and having a unit thickness $dr$, it is possible to determine the geometrical factor of each of these cylindrical shells as a function of its radius from the borehole axis. One such cylinder is shown in FIG. 7. The geometrical factor for each cylindrical shell of radius $r$, designated $G_r$, is related to $9(r,z)$ by the following equation:

$$G_r = \int_{-\infty}^{+\infty} g(r,z)\,dz \quad (29)$$

Figure 8:
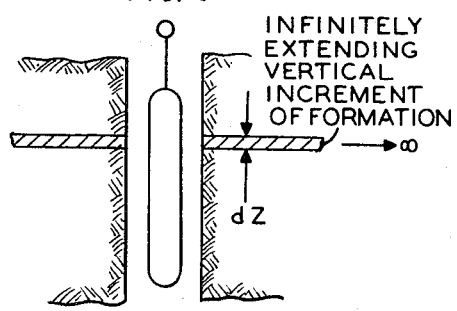

Likewise, it is possible to divide a formation region into a plurality of horizontal slabs of unit thickness $dz$ with each slab having a uniform conductivity. One such slab is shown in FIG. 8. The geometrical factor for each of these horizontal slabs is related to the unit geometrical factor $9(r,z)$ by the following expression:

$$G_z = \int_0^\infty g(r,z)\,dr \quad (30)$$

Since $G_r$ is the geometrical factor for each cylindrical shell location a radial distance $r$ from the borehole axis, $G_r$ is known as the radial geometrical factor. Likewise, since $G_z$ is the geometrical factor for a vertical horizontal slab of distance $z$ from the center point of the coil system, $G_z$ is referred to as the vertical geometrical factor. It is possible to plot both the radial and vertical geometrical factor for any given coil array and from these geometrical factor plots, it is possible to visually determine the contribution of the different layers and cylinders of ground to the signal produced by any given coil system.

Figure 9:
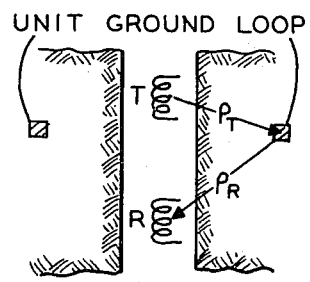

The same reasoning discussed above to arrive at the radial and vertical geometrical factors for a conventional induction logging system applies as well to the induction logging system of the present invention. However, the geometrical factor applied to the present invention will be in the form of a complex number. For a two coil array, the geometrical factors $g_u$ and $g_v$ relating to the measurement $\sigma_u$ and $\sigma_v$ can be expressed as:

$$g_u + jg_v = g(r,z)\frac{e^{j\gamma\rho_T}(1-j\gamma\rho_T)e^{j\gamma\rho_R}(1-j\gamma\rho_R)}{e^{j\gamma L}} \quad (31)$$

where $g(r,z)$ is the geometrical factor given in the above-mentioned Doll paper, $\rho_T$ is the distance between the transmitter coil and the unit ground loop, and $\rho_R$ is the distance between the receiver coil and the unit ground loop. Representations of the dimensions $\rho_T$ and $\rho_R$ are shown in FIG. 9.

Breaking Equation (27) into separate expressions for $g_u$ and $g_v$, we have:

$$g_u = g_0 e^{xs}[(1-xs+VP)\cos(ys) + (ys+uP)\sin(ys)] \quad (32)$$

and $$g_v = g_0 e^{xs}[(1-xs+VP)\sin(ys) - (ys+uP)\cos(ys)] \quad (33)$$

where $$g_0 = \frac{L}{2}\frac{r^3}{\rho_T^3 \rho_R^3}$$

$$S = \rho_T + \rho_R$$

$$P = \rho_T \cdot \rho_R$$

$$u = \omega\mu\sigma_u$$

$$v = \omega\mu\sigma_v$$

$$x = \sqrt{\frac{\sqrt{u^2+v^2}+V}{2}}$$

and $$y = \sqrt{\frac{\sqrt{u^2+v^2}-V}{2}}$$

$g_u$ and $g_v$ for a multicoil array can also be expressed by taking into account the dimensions, spacing, etc., of all of the coils.

In the same manner that the radial and vertical geometrical factors of Equations (29) and (30) were derived for the conventional induction logging equipment, the radial and vertical geometrical factors of the unit geometrical factors $g_u$ and $g_v$ can also be derived. Thus, the radial geometrical factor for the unit geometrical factor $g_u$ is:

$$G_{ur} = \int_{-\infty}^{+\infty} g_u dz \qquad (34)$$

and the radial geometrical factor for the unit geometrical factor $g_v$ is:

$$G_{vr} = \int_{-\infty}^{+\infty} g_v dz \qquad (35)$$

The vertical geometrical factor for the unit geometrical factor $g_u$ is:

$$G_{uz} = \int_0^{\infty} g_u dr \qquad (36)$$

and the vertical geometrical factor for the unit geometrical factor $g_v$ is:

$$G_{vz} = \int_0^{\infty} g_v dr \qquad (37)$$

The radial geometrical factors $G_{ur}$ and $G_{vr}$ for a two-coil array are shown in FIG. 10. From FIG. 10, it can be seen that the negative and positive areas under the curve of the radial geometrical factor $G_{vr}$, designated $K$ and $L$ respectively, are equal so that in a homogenous medium the total response for $G_{vr}$ will be zero. On the other hand, if the region closest to the coils is more conductive than the radially remote region, the response will be negative. Conversely, if the radially remote regions are more conductive, the response given by $G_{vr}$ will be positive. The radial geometrical factor $G_{ur}$ is very much the same as the radial geometrical factor given by the geometrical factor theory set forth in the above-mentioned paper by Doll.

Turning now to FIG. 11, there is shown a plot of the vertical geometrical factors $G_{uz}$ and $G_{vz}$ for a two-coil array. The vertical geometrical factor $G_{vz}$ is shown on the lefthand side of the borehole, Like the radial geometrical factor $G_{vz}$, the positive and negative areas under the curve for the vertical geometrical factor $G_{vz}$ are equal so that in a homogeneous medium the total response given by the vertical geometrical factor $G_{vz}$ will be zero. In FIG. 11, the center negative response region is designated H and the positive upper and lower response regions are designated $I$ and $J$ respectively. If the formation bed under investigation is more conductive than the adjacent formation beds, i.e., if the conductivity in region $H$ is greater than that in regions $I$ and $J$, the response given by the vertical geometrical factor $G_{vz}$ will be negative and conversely if the adjacent beds are more conductive, the response will be positive.

The vertical geometrical factor $G_{uz}$ of FIG. 11 is very similar to the geometrical factor for a two-coil array given by the geometrical factor theory set forth in the earlier mentioned Doll paper. Therefore, the conductivity value $\sigma_u$ will be somewhat similar to the usual conductivity measured by the usual induction logging tool. It should be mentioned here that the geometrical factors vary as a function of conductivity as seen from Equations (32) and (33). The curves shown in FIGS. 10 and 11 are for a typical situation.

While the radial and vertical geometrical factors $G_{ur}$, $G_{vr}$, $G_{uz}$, and $G_{vz}$ were shown for a two-coil array, they can be derived for any coil array and used as an aid in interpreting the measurements of $\sigma_u$ and $\sigma_v$ produced by any such coil array.

Now turning to FIG. 12, there are shown logs of $\sigma_u$ and $\sigma_v$ produced when a coil array investigates the formation shown on the lefthand side of FIG. 12. There are three homogeneous formations having conductivities $\sigma_1$, $\sigma_2$, and $\sigma_3$ shown in the top portion of FIG. 12. The conductivity $\sigma_2$ is greater than the conductivity $\sigma_1$ and $\sigma_2$ is greater than $\sigma_3$. The log of $\sigma_u$ produced when investigating these formations will be somewhat similar to the conductivity log produced by the usual induction logging apparatus. However, the $\sigma_v$ log will be completely different from any log previously recorded. In FIG. 12, the exploring device is deemed to be moving from top to bottom.

From FIG. 12, it can be seen that when the coil array passes from the formation $\sigma_1$ to the more conductive formation $\sigma_2$, $\sigma_v$ will first deflect in a positive direction as the coil array approaches the bed boundary and then deflect in a negative direction as the coil array passes the bed boundary. $\sigma_v$ will eventually return to zero when the total response of the coil array is contributed by the formation $\sigma_4$ exclusively. The reason for this can be seen by referring to the vertical geometrical factor $G_{vz}$ of FIG. 11. From FIG. 11, it can be seen that when the coil array is positioned such that the positive portions $I$ or $J$ of the geometrical factor are opposite a formation which is more conductive than the formation opposite the central portion $H$, the positive signal components will exceed the negative signal components. Conversely, when the central portion $H$ is opposite the more conductive formation bed $\sigma_2$, the negative signal components will exceed the positive signal components. Thus, it can be seen why $\sigma_v$ has a positive deflection followed by a negative deflection as the coil array traverses the bed boundary from formation $\sigma_1$ to formation $\sigma_2$.

When the coil array passes from the formation bed $\sigma_2$ to the less conductive formation bed $\sigma_3$, the $\sigma_v$ curve will deflect in a negative direction and then deflect in a positive direction since the geometrical factor portion $H$ will be opposite the more conductive formation as the coil array moves toward the bed boundary. Then, as the coil array moves away from the bed boundary, the geometrical factor portion $H$ will be opposite the less conductive formation $\sigma_3$, thus producing a positive deflection. These deflections give a sharp definition of bed boundaries.

Now consider what happens when the coil array investigates formations having zones invaded with a conductive drilling mud. Such formations are represented in FIG. 12 as the formations of conductivities $\sigma_{t4} - \sigma_{x4}$ and $\sigma_{t6} - \sigma_{x6}$. The formation beds 4 and 6 are separated by a bed of conductivity $\sigma_5$. $\sigma_{t4}$ is greater than $\sigma_{x4}$ and $\sigma_{x6}$ is greater than $\sigma_{t6}$. For the beds 4 and 6, the $\sigma_u$ log will give the average conductivity of each formation bed. The $\sigma_v$ curve however will show a positive deflection opposite the bed 4 because the region near the coil array ($\sigma_{x4}$) is less conductive than the radially remote non-invaded zone ($\sigma_{t4}$). The reason why the deflection will be positive can be seen by referring to FIG. 10 where it is shown that the radial geometrical factor $G_{vr}$ has a negative response portion $K$ radially near the coil array and a positive response portion $L$ radially remote from the coil array. Thus, if invaded zone conductivity $\sigma_{54}$, the positive response portion of the geometrical factor curve of FIG. 10 will contribute more to the signal than the negative response portion.

Continuing, as the coil array approaches the bed boundary between formation beds 4 and 5, the $\sigma_u$ log will show a decreased conductivity to reflect a decrease in average conductivity between the two formation beds. The $\sigma_v$ log, on the other hand, will remain positive as the coil array approaches this bed boundary since the average conductivity $\sigma_5$ of the No. 5 bed is greater than that of the No. 4 bed. As the coil array moves into the No. 5 bed, the $\sigma_v$ log will show no deflection again since the No. 5 bed is homogenous. Then, as the coil array moves closer to the bed boundary between beds 5 and 6 and is thus more influenced by the No. 6 bed, the $\sigma_v$ log will eventually move to a negative deflection to indicate the fact that the flushed zone conductivity $\sigma_{x6}$ is greater than the non-invaded zone conductivity $\sigma_{t6}$. The reason for this negative deflection is that the conductivity in the negative response portion $K$ of the geometrical factor curve of FIG. 10 is greater than the conductivity in the positive response portion $L$ thereof. Then, as the coil array moves toward the bed boundary between the Nos. 6 and 7 beds, the $\sigma_v$ log will become positive since $\sigma_7$ is greater than the average conductivity of bed No. 6. Then, as the coil array moves away from the bed boundary, the $\sigma_v$ log will deflect negative for the converse reason and eventually stabilize at zero because bed No. 7 is homogenous.

In addition to recording $\sigma_u$ and $\sigma_v$ to obtain logs which give the average conductivity and heterogeneity of a formation, it is also possible to combine $\sigma_u$ and $\sigma_v$ in a manner which will give information concerning the conductivity of different radial regions of a formation.

Turning now to FIG. 13, there is shown a plot of relative response vs. radial distance from the borehole (i.e., a plot of radial geometrical factor) for purposes of explaining how $\sigma_u$ and $\sigma_v$ can be combined to give such information. The solid line curve $g_u$ in FIG. 13 is a plot of the radial geometrical factor $g_u$ for a multicoil array such as the one shown in the above-mentioned Tanguy patent. The solid line curve $\alpha_2 g_v$ is a plot of the radial geometrical factor $g_v$ weighted by the factor $\alpha_2$. By combining these two geometrical factor curves, $g_u$ and $\alpha_2 g_v$, a resultant geometrical factor $g_u + \alpha_2 g_v$ which corresponds to a radially deeper investigation can be obtained. This can be seen by referring to FIG. 14 which is a vertical projection of the combined geometrical factors of FIG. 13. The solid line curve in FIG. 14 is the geometrical factor resulting from combining $g_u$ with $\alpha_2 g_v$. By comparison of this geometrical factor $g_u + \alpha_2 g_v$ of FIG. 14 with the geometrical factor $g_u$ of FIG. 13, it can be seen that $g_u + \alpha_2 g_v$ gives a deeper radial investigation than $g_u$. The geometrical factor $g_u + \alpha_2 g_v$ corresponds to combining $\sigma_u$ and $\sigma_v$ in accordance with the expression $\sigma_u + \alpha_2 \sigma_v$.

A relatively shallow radial investigation can be achieved by subtracting the geometrical factor $g_v$ times a selected weighting factor $\alpha_1$ from $g_u$. Thus, in FIG. 13, by adding the dashed line plot $-\alpha_1 g_v$ to the geometrical factor curve $g_u$, the radial geometrical factor $g_u - \alpha_1 g_v$ of FIG. 14 is obtained. By comparison, it can be seen that $g_u - \alpha_1 g_v$ gives a shallower investigation than $g_u$. In signal terms, this operation corresponds to subtracting $\alpha_1 \sigma_v$ from $\sigma_u$.

Turning now to FIG. 15, there is shown apparatus for combining $\sigma_u$ and $\sigma_v$ in accordance with the above discussion to give signals individually representing the conductivity of different radial regions of a formation. The signal $\sigma_v$ is weighted by the factors $+\alpha_2$ and $-\alpha_1$ in weighting circuits 101 and 102 respectively, and applied to adding circuits 103 and 104 respectively. The signal $\sigma_u$ is also applied to adding circuits 103 and 104 such that these circuits will give the output signals $\sigma_u + \alpha_2 \sigma_v$ and $\sigma_u - \alpha_1 \sigma_v$ respectively. The weighting circuits 101 and 102 and their corresponding adding circuits 103 and 104 could individually comprise an operational amplifier and associated input resistors with the relative values of these input resistors and the choice of connection to the plus or minus input of the amplifier determining the weighting factors $+\alpha_2$ and $-\alpha_1$. The signals $\sigma_u$ and $\sigma_v$ can also be recorded.

In (i.e., to the earlier discussed computational techniques for practicing the present invention, it is also possible to implement at least part of the present invention with much simpler computational techniques. For example, a value of formation conductivity could be obtained in the usual manner (i.e., $\sigma_r$ boosted for skin effect, hereinafter designated $\sigma_{rb}$) and a value of $\sigma_x$ corresponding to this boosted value of $\sigma_r$ could be obtained. This value of $\sigma_x$ corresponding to $\sigma_{rb}$ is hereafter designated $\sigma_{xb}$. The relationship between $\sigma_{xb}$ and the measured value of $\sigma_x$ would then be representative of formation heterogeneity and in a way similar to the $\sigma_v$ described above.

To obtain a value of conductivity boosted for skin effect, i.e., $\sigma_{rb}$, a system such as shown in U.S. Pat. No. 3,226,633 granted to W. P. Schneider on Dec. 28, 1965, could be used. The corresponding value of $\sigma_{xb}$ can be obtained using the following expression:

$$\text{Log } \sigma_{xb} = P + \frac{3}{2} \text{Log } \sigma_r + O\sigma_r \quad (39)$$

where $P$ and $Q$ are constants whose values are dependent on the particular coil array utilized.

Turning now to FIG. 16, there is shown the homogeneous formation conductivity curve of FIGS. 2 and 3 reproduced for purposes of explaining what the terms $\sigma_{rb}$ and $\sigma_{xb}$ represent. If the measured values of $\sigma_x$ and $\sigma_r$ are the values $\sigma_{x1}$ and $\sigma_{r1}$ of FIG. 16 which give the plotted point 88, then the projection of $\sigma_{r1}$ onto the homogeneous conductivity curve 30 gives the skin effect corrected conductivity term $\sigma_{rb}$. The projection of $\sigma_{rb}$ onto the $\sigma_x$ axis gives the value of $\sigma_x$ corresponding to $\sigma_{rb}$, i.e., $\sigma_{xb}$. The difference between this $\sigma_{xb}$ term and the measured value of $\sigma_x$, in this case $\sigma_{x1}$, is roughly proportional to the heterogeneous conductivity term $\sigma_v$. This difference term is designated $\Delta \sigma_x$ in FIG. 16.

It can be seen that this technique described in FIG. 16 is a vast simplification of the more rigorous techniques discussed earlier. Instead of projecting the point 88 normal to the homogeneous conductivity curve 30 to obtain values of $\sigma_u$ and $\sigma_v$ (where $\sigma_u$ is the projected point on the curve 30 and $\sigma_v$ is the length of that projection), the plotted point 88 is always projected parallel to the axes of the system (i.e., parallel to the lines $\sigma_r = 0$, $\sigma_x = 0$). Since, in this latter case, the direction of projection is always known, the realization of apparatus to implement the method will be relatively simple as contrasted with the former case where the direction of projection is different for different values of $\sigma_r$ and $\sigma_x$.

Referring now to FIG. 17, there is shown such apparatus for practicing the technique depicted in FIG. 16. Assume that the in-phase and phase quadrature signals $V_r$ and $V_x'$ have been converted to the conductivity terms $\sigma_r$ and $\sigma_x$ (e.g., with potentiometers). The derived $\sigma_r$ signal is applied to a skin effect function former 90 which may be constructed in the manner shown in the earlier discussed Schneider patent to produce the skin effect corrected conductivity signal $\sigma_{rb}$.

The in-phase signal $\sigma_r$ is also applied to a computer 91 which computes $\sigma_{xb}$ in accordance with Equation (38). Within the computer 91, the $\sigma_r$ signal is applied to a logarithmic circuit 92 and to a multiplying circuit (e.g., a potentiometer) 93. The output signal from logarithmic converter 92 is multiplied by 3/2 in a circuit 94 (e.g., a potentiometer) and applied to an adding circuit 96 along with the signal $Q\sigma_r$ from circuit 93 and a constant $P$ from a signal generating circuit 95. In accordance with Equation (38), the output signal from adding circuit 96 will be proportional to Log $\sigma_{xb}$. After processing by an anti-log circuit 97, a signal proportional to $\sigma_{xb}$ is obtained and is subtracted from the derived signal $\sigma_x$ in a difference circuit 98 to produce a signal designated $\Delta\sigma_x$ where:

$$\Delta\sigma_x = \sigma_x - \sigma_{xb} \qquad (40)$$

This signal $\Delta\sigma_x$ is, for many common values of $\sigma_r$ and $\sigma_x$, roughly proportional to the heterogeneity term $\sigma_v$. Both $\Delta\sigma_x$ and $\sigma_{rb}$ are recorded as a function of borehole depth by a recorder 99.

The voltage component of the receiver voltage produced by the mutual coupling between transmitter and receiver coils was eliminated in the FIG. 1 embodiment by the transformer 19 subtracting a fixed voltage magnitude from the receiver coil voltage corresponding to the magnitude of the voltage component due to this mutual component. This cancelation of the mutual component would work just as well for a coil array having three or more coils. However, it is possible to design coil arrays which inherently cancel out the mutual coupling between the transmitter and receiver coils. One such coil array is shown in U.S. Pat. No. 3,067,383 granted to D. R. Tanguy on Dec. 4, 1962. When using such a coil array, the mutual coupling cancelation transformer 19 of FIG. 1 is not necessary. If the support member which supports the coils is well designed, as by using a pressure balanced support member of the type shown in U.S. Pat. No. 2,964,698 granted to A. E. Lehmberg, Jr., on Dec. 13, 1960, then the mutual component should be substantially zero under most borehole conditions.

While either the coil system shown in the Tanguy patent or the cancelation transformer 19 of FIG. 1 are adequate for elimination of the mutual component, it may be desirable to actively measure the mutual coupling component and cancel it in accordance with the value of the measured mutual component. However, when operating at one frequency only, it would be impossible to separate the mutual component from the phase-quadrature component resulting from reactive current flow in the adjoining formation material. However, by operating an induction logging system at two frequencies, it is possible to cancel the mutual component of the receiver voltage at one frequency and to measure the phase-quadrature formation component at a second, higher frequency. The reason why this is possible can be seen by referring to the expressions for the mutual component $V_m$ of the phase-quadrature component $V_x'$ found in Equations (13) and (14). At low frequencies, the phase-quadrature formation component $V_x'$ will be extremely small, approaching zero, since the skin depth $\delta$ will be extremely large, i.e., from equation (4), $\delta$ is proportional to the inverse of frequency. (Note: A coil array having more than a single transmitter and receiver coil would desirably be utilized here and thus the multicoil version of Equations (13) and (14) should be used here. However, for purposes of discussion, Equations (13) and (14) serve just as well.)

On the other hand, the mutual component $V_m$ given by Equation (13) is not minimized to the same extent as the phase-quadrature formation component $V_x'$ for lower frequencies. In fact, the frequency can be set low enough that $V_x'$ is negligible. It can also be seen that the only variable in Equation (13) is the frequency (the transmitter current I is held constant and the formation permeability $\mu$ is assumed to be constant). Thus, if the mutual component $V_m$ is measured at one frequency, the mutual component at a higher frequency will be proportional to this mutual component at the first frequency, the proportionality factor being the ratio of the two frequencies. Thus, the mutual component $V_m$ can be measured at one frequency and multiplied by this proportionality factor to arrive at the mutual component at the second frequency. This second frequency mutual component can then be subtracted from the total phase-quadrature receiver voltage component $V_x$ to produce a signal proportional to the formation phase-quadrature component $V_x'$.

Turning now to FIG. 18, there is shown apparatus for performing this function. In FIG. 18, a coil array 65 is passed through a borehole 66 for investigating adjacent formations 67. The coil array 65 includes three transmitter coils designated $+T$, $-t_1$ and $-t_2$ and three receiver coils designated $+R$, $-r_1$ and $-r_2$. This coil array can be found in the previously mentioned Tanguy U.S. Pat. No. 3,067,383 and need not be discussed further here.

First and second oscillators 68 and 70 operating at frequencies $f_1$ and $nf_1$ respectively, apply current at these two frequencies to a mixer 69. Mixer 69 combines the signals from oscillators 68 and 70 and provides suitable isolation between the two oscillators. The mixer 69 then supplies the transmitter current at the two frequencies $f_1$ and $nf_1$ to the transmitter coils which are series connected in accordance with their designated polarities. The current in the transmitter coils set up secondary current flows at the two frequencies in the formations which in turn induces voltage signals in the receiver coils. The transmitter coils also cause voltage components at the two frequencies to be induced in the receiver coils arising from the mutual coupling between the transmitter and receiver coils.

The receiver coils are connected in series in accordance with their designated polarities and the voltage signals developed across the three receiver coils are applied to a preamplifier 71 for application to three separate phase-sensitive detectors 72, 73 and 74. The phase-sensitive detector 72 derives its phase reference signal from an inductor 75 placed in series between the $f_1$ oscillator 68 and mixer 69. A phase-quadrature voltage at the frequency $f_1$ is developed across the inductor 75 and thus the output of the phase-sensitive detector 72 will be a DC signal proportional to that component of the receiver coil voltage at the lower frequency $f_1$ which is in phase-quadrature with the transmitter current at frequency $f_1$. In accordance with the earlier discussion, this output signal from detector 72, designated $V_m(f_1)$ will thus be proportional to the receiver voltage resulting from the mutual coupling between the transmitter and receiver coils at the lower frequency $f_1$. This output signal from detector 72 is then applied to a weighting circuit 76 which multiplies the voltage signal $V_m(f_1)$ by the factor $n$ such that the output signal from weighting circuit 76 will be equal to the mutual component of the receiver coil voltage at the higher frequency $nf_1$. This signal $V_m(f_1)$ is then applied to the subtracting input of a differential amplifier 78.

The phase-sensitive detector 73 derives its phase-reference signal from an inductor 77 located in the $nf_1$ transmitter current circuit. The voltage developed across this inductor 77 is in phase-quadrature with the transmitter current at the frequency $nf_1$ so that the detector 73 will produce a DC output signal, designated $V_x(nf_1)$, proportional to that portion of the receiver coil voltage which is in phase-quadrature with the transmitter coil current at frequency $nf_1$. This signal $V_x(nf_1)$ is applied to the positive input of the differential amplifier 78. Differential amplifier 78 subtracts a signal proportional to the mutual component at frequency $nf_1$ from the total phase-quadrature component signal at frequency $nf_1$. Thus, the output signal from differential amplifier 78 will be proportional to the phase-quadrature component resulting solely from formation secondary current flow at the higher frequency $nf_1$.

The phase-reference signal for the detector 74 is derived from a resistor 78 in the $nf_1$ transmitter current path such that detector 78 will produce an output signal, designated $V_{r(nf_1)}$ proportional to that portion of the receiver coil voltage at the higher frequency $nf_1$ which is in-phase with the transmitter coil current at this higher frequency. These signals $V_{x'(nf_1)}$ and $V_{r(nf_1)}$ are then transmitted to the surface of the earth for application to the computer of FIG. 4. This computer computes values of $\sigma_u$ and $\sigma_v$ in the same manner as previously discussed. (Of course, any of the other alternative computing methods could be used with FIG. 18.)

It can thus be seen that through the practice of the present invention, an accurate measure of the average conductivity of the media surrounding the coil array can be obtained without errors resulting from heterogeneous formations and skin effect. Additionally, a log of the heterogeneity of the media surrounding the coil array can be obtained. Furthermore, these measurements can be obtained through the use of only one coil array.

It should be pointed out here that while the two phase components of the receiver coil voltage have been measured and utilized to produce $\sigma_u$ and $\sigma_v$, it is also possible to measure other parameters to produce $\sigma_u$ and $\sigma_v$. Thus, the amplitude of the receiver coil voltage and its phase angle could be measured to produce the same results. For an example of this, referring to FIG. 3 and assuming that the point 36 represents the measurements made by the coil array, measurements of the length of the vector between this point and the origin ($V_r = V_x' = 0$) and the angle between this vector and either the $V_r$ axis or the $V_x'$ axis (or transformed versions thereof) could be used to find the point 36 relative to the curve 30. Values representing the conductivity and heterogeneity of the investigated formations could then be obtained.

It should also be pointed out that while embodiments have been shown which operate to project the measured $V_r$, $V_x'$ point (e.g., point 36 in FIG. 3) in a perpendicular fashion to the curve 30 (FIG. 5) and parallel to the $V_x'$ axis onto the curve 30 (FIG. 17), other embodiments which project the measured $V_r$, $V_x'$ point in other fashions to the curve 30 will be readily apparent to those familiar with the art and are intended to be within the scope of the present invention. In this connection, it is to be noted that the approximation provided by the FIG. 4 embodiment will not always project the point in a perpendicular fashion to the curve 30. For low conductivities (i.e., points near the origin $V_r$, $V_x' = 0$), the projection will be shifted from a perpendicular to the curve 30 projection towards a parallel to the $V_x'$ axis project. On the other hand, for high conductivities, the direction of projection will tend to be shifted towards a projection parallel to the $V_r$ axis.

Additionally, while the formation model chosen as the best mode for practicing the present invention has been a homogeneous formation given by the curve 30, it can be appreciated that other formation models could be used as well. For example, another curve parallel to but displaced from the curve 30 could be used as well.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for investigating earth formations traversed by a borehole, comprising:
   a. a coil array adapted for movement through a borehole and having at least one transmitter coil and at least one receiver coil;
   b. means for energizing said at least one transmitter coil with current to thereby cause a voltage to be induced into said at least one receiver coil, which induced voltage is at least in part representative of certain electrical characteristics of an adjoining formation;
   c. means for detecting selected parameters of the receiver coil voltage; and
   d. means for combining representations of said selected parameters of the receiver coil voltage in a non-linear manner to produce a parameter which is non-linearly related to said selected parameters and representative of the average conductivity or the heterogeneity of a media surrounding the coil array.

2. Apparatus for investigating earth formations traversed by a borehole, comprising:
   a. a coil array adapted for movement through a borehole and having at least one transmitter coil and at least one receiver coil;

b. means for energizing said at least one transmitter coil with current to thereby cause a voltage to be induced into said at least one receiver coil, which induced voltage is at least in part representative of certain electrical characteristics of an adjoining formation;

c. means for detecting those components of the receiver coil voltage which are in-phase with the transmitter coil current and in phase-quadrature with the transmitter coil current; and d. computing means for combining representation of said in-phase and phase-quadrature components of the receiver coil voltage in a non-linear manner to produce a parameter which is non-linearly related to both of said phase components and representative of the average conductivity or the heterogeneity of a media surrounding the coil array.

3. Apparatus for investigating earth formations traversed by a borehole, comprising:

a. a coil array adapted for movement through a borehole and having at least one transmitter coil and at least one receiver coil;

b. means for energizing said at least one transmitter coil with current to thereby cause a voltage to be induced into said at least one receiver coil, which induced voltage is representative of certain electrical characteristics of an adjoining formation;

c. means for detecting those components of the receiver coil voltage which are in-phase with the transmitter coil current and in phase-quadrature with the transmitter coil current; and d. means for combining representations of said in-phase and phase-quadrature components of the receiver coil voltage in a non-linear manner to produce parameters which are representative of the average conductivity and the heterogeneity of a media surrounding the coil array, each of said parameters being non-linearly related to at least one of said phase components.

4. Apparatus for investigating earth formations traversed by a borehole, comprising:

a. a coil array adapted for movement through a borehole and having at least one transmitter coil and at least one receiver coil;

b. means for energizing said at least one transmitter coil with current to thereby cause a voltage to be induced into said at least one receiver coil, which induced voltage has components resulting from the effect of an adjoining formation on the electromagnetic field initiated by the transmitter coil current and the mutual coupling between the transmitter and receiver coils;

c. means for canceling the mutual coupling component of the voltage induced in said at least one receiver coil;

d. means for detecting those components of the receiver coil voltage which are in-phase with the transmitter coil current and in phase-quadrature with the transmitter coil current; and e. computing means for combining said in-phase and phase-quadrature components of the receiver coil voltage in a non-linear manner to produce a parameter which is non-linearly related to both of said phase components and representative of the average conductivity or the heterogeneity of a media surrounding the coil array.

5. Apparatus for investigating earth formations traversed by a borehole, comprising:

a. means for generating current having a reference phase;

b. means responsive to said generated current for producing an electromagnetic field in an earth formation surrounding a borehole;

c. means for detecting said electromagnetic field and producing an electrical signal representative of the effect of an earth formation on said electromagnetic field;

d. means for detecting the in-phase and phase-quadrature components, relative to said reference phase, of said electrical signal and generating phase component signals representative thereof; and e. computing means for combining said phase component signals in a non-linear manner to produce a parameter which is non-linearly related to both of said component signals and representative of the average conductivity or the heterogeneity of an earth formation.

6. The apparatus of claim 2 wherein said means for computing a parameter includes means responsive to said two-phase component signals for computing orthogonally related values of the average conductivity and heterogeneity of a formation.

7. The apparatus of claim 2 wherein said in-phase and phase-quadrature voltage components correspond to orthogonally related values of said receiver coil voltage in a rectangular coordinate system, and wherein said means for computing a parameter includes means for converting said in-phase and phase quadrature components into orthogonally related values of average conductivity and heterogeneity in a coordinate system which is curvilinear when referenced to said rectangular coordinate system.

8. The apparatus of claim 5 wherein said computing means includes means for combining said phase component signals to produce a first signal, function forming means for forming a non-linear function of said first signal to produce a second signal, means for combining said first and second signals to produce an output signal representative of an average conductivity of an earth formation.

9. The apparatus of claim 5 wherein said computing means includes means for combining said phase component signals to produce a first signal, function forming means for forming a non-linear function of said first signal to produce a second signal, means for combining said first and second signals to produce a third signal, means for combining said third signal with said phase-quadrature component signal to produce an output signal representative of the heterogeneity of an earth formation.

10. Apparatus for investigating earth formations traversed by a borehole, comprising:

a. a coil array adapted for movement through a borehole and having at least one transmitter coil and at least one receiver coil;

b. means for energizing said at least one transmitter coil with current to thereby cause a voltage to be induced into said at least one receiver coil, which induced voltage is at least in part representative of certain electrical characteristics of an adjoining formation;

c. means for detecting those components of the receiver coil voltage which are in-phase with the transmitter coil current and in phase-quadrature with the transmitter coil current; and d. computing means responsive to said in-phase and phase-quadrature components of the receiver coil voltage for converting said phase components to orthogonally related parameters which are non-linearly related to said phase components and representative of the average conductivity and heterogeneity of an earth formation.

11. The apparatus of claim 10 and further including means for combining said orthogonally related values of average conductivity and heterogeneity to produce individual measurements of the conductivity of different radial portions of a formation.

12. The apparatus of claim 11 wherein said means for combining orthogonally related values of average conductivity $\sigma_u$ and $\sigma_v$ includes means for additively combining at least a portion of $\sigma_v$ with at least a portion of $\sigma_u$ to obtain a representation of the conductivity of a first radial portion of a formation, and means for subtractively combining at least a portion of $\sigma_v$ with at least a portion of $\sigma_u$ to obtain a representation of the conductivity of a second radial portion of a formation.

13. A method of investigating earth formations traversed by a borehole, comprising:

a. generating current having a reference phase;

b. producing an electromagnetic field in an earth formation surrounding a borehole in response to said generated current;

c. detecting said electromagnetic field and producing an electrical signal representative of the effect of an earth formation on said electromagnetic field;

d. detecting the in-phase and phase-quadrature components, relative to said reference phase, of said electrical signal and generating phase component signals representative thereof; and e. combining representations of said phase component signals in a non-linear manner to compute a parameter which is non-linearly related to both of said phase components and representative of the average conductivity or the heterogeneity of an earth formation.

14. The method of claim 13 wherein the step of combining representations of signals to compute a parameter includes the step of combining representations of said signals in a non-linear manner to produce representations of the average conductivity and heterogeneity that an earth formation would have to possess to produce said phase component signals.

15. The method of claim 13 wherein said in-phase and phase-quadrature voltage components correspond to orthogonally related values of said receiver coil voltage in a rectangular coordinate system, and wherein said step of combining representations of signals to compute a parameter includes converting said in-phase and phase-quadrature components into orthogonally related values of average conductivity and heterogeneity in a coordinate system which is curvilinear when referenced to said rectangular coordinate system.

16. Apparatus for investigating earth formations traversed by a borehole, comprising:

a. a coil array adapted for movement through a borehole and having at least one transmitter coil and at least one receiver coil;

b. means for energizing said at least one transmitter coil with current to thereby cause a voltage to be induced into said at least one receiver coil, which induced voltage is at least in part representative of certain electrical characteristics of an adjoining formation;

c. means for detecting those portions of the receiver coil voltage which are in-phase with the transmitter coil current and in phase-quadrature with the transmitter coil current; and d. computing means responsive to said in-phase and phase-quadrature components of the receiver coil voltage for computing a parameter which is representative of the average conductivity or the heterogeneity of a media surrounding the coil array, including means responsive to said in-phase component for computing a first parameter representative of a non-linear transformation of said in-phase component to a corresponding phase-quadrature representation thereof, means responsive to said first parameter and said phase-quadrature component of the receiver coil voltage for computing a second parameter representative of the heterogeneity of an earth formation.

17. A method of investigating earth formations traversed by a borehole, comprising:

a. generating current having a reference phase;

b. producing an electromagnetic field in an earth formation surrounding a borehole in response to said generated current;

c. detecting said electromagnetic field and producing an electrical signal representative of the effect of an earth formation on said electromagnetic field;

d. detecting the in-phase and phase-quadrature components, relative to said reference phase, of said electrical signal and generating phase component signals representative thereof; and e. combining representations of said phase component signals to compute a parameter which is representative of the average conductivity or the heterogeneity of an earth formation, including generating representations of an approximation of the conductivity and heterogeneity of an earth formation, computing representations of equivalent phase component signals which would result from a formation of the type which would possess said conductivity and heterogeneity, comparing said representations of the equivalent phase component signals with said representations of the measured phase component signals and producing a representation of the difference therebetween, repeatedly adjusting the values of said approximate representations of the conductivity and heterogeneity and re-computing representations of said equivalent phase component signals from said adjusted values for re-comparison with said measured phase component values until said difference representation is reduced below a predetermined value, whereupon the last adjusted values of conductivity and heterogeneity are selected as representative of the true formation conductivity and heterogeneity.

18. A method of investigating earth formations traversed by a borehole, comprising:
   a. generating current having a reference phase;
   b. producing an electromagnetic field in an earth formation surrounding a borehole in response to said generated current;
   c. detecting said electromagnetic field and producing an electrical signal representative of the effect of an earth formation on said electromagnetic field;
   d. detecting the in-phase and phase-quadrature components, relative to said reference phase, of said electrical signal and generating phase component signals representative thereof; and
   e. combining representations of said phase component signals to compute a parameter which is representative of the average conductivity or the heterogeneity of an earth formation, including computing a first parameter representative of a non-linear transformation of said in-phase component to a corresponding phase-quadrature representation thereof, and using said first parameter and said phase-quadrature component of the receiver coil voltage for computing a second parameter representative of the heterogeneity of an earth formation.

19. A method of investigating earth formations traversed by a borehole, comprising:
   a. generating current having a reference phase;
   b. producing an electromagnetic field in an earth formation surrounding a borehole in response to said generated current;
   c. detecting said electromagnetic field and producing an electrical signal representative of the effect of an earth formation on said electromagnetic field;
   d. detecting the in-phase and phase-quadrature components, relative to said reference phase, of said electrical signal and generating phase component signals representative thereof; and
   e. combining representations of said phase component signals to compute a parameter which is representative of the average conductivity or the heterogeneity of an earth formation, including combining representations of said phase component signals to produce a first signal, forming a non-linear function of said first signal to produce a second signal, and combining said first and second signals to produce an output signal representative of the average conductivity of an earth formation.

20. A method of investigating earth formations traversed by a borehole, comprising:
   a. generating current having a reference phase;
   b. producing an electromagnetic field in an earth formation surrounding a borehole in response to said generated current;
   c. detecting said electromagnetic field and producing an electrical signal representative of the effect of an earth formation on said electromagnetic field;
   d. detecting the in-phase and phase-quadrature components, relative to said reference phase, of said electrical signal and generating phase component signals representative thereof; and
   e. combining representations of said phase component signals to compute a parameter which is representative of the average conductivity or the heterogeneity of an earth formation, including combining representations of said phase component signals to produce a first signal, forming a non-linear function of said first signal to produce a second signal, combining said first and second signals to produce a third signal, and combining said third signal with said phase-quadrature component signal to produce an output signal representative of the heterogeneity of an earth formation.

21. A method of investigating earth formations traversed by a borehole, comprising:
   a. moving a coil array having at least one transmitter coil and at least one receiver coil through a borehole;
   b. energizing said at least one transmitter coil with current to thereby cause a voltage to be induced into said at least one receiver coil, said induced voltage being expressed by the relationship:

$$V = V_r + jV_x' = \Sigma \frac{A_{t_m} A_{r_n}}{I_{mn}} \frac{2}{\omega\mu L_{mn}^2} e^{j\gamma L_{mn}}(1 - j\gamma L_{mn})$$

where
   $A_{t_m}$ is the product of the cross-sectional area and the number of turns for the $m^{th}$ transmitter coil,
   $A_{r_n}$ is the product of the cross-sectional area and the number of turns of the $n^{th}$ receiver coil,
   $L_{mn}$ is the spacing between coil centers of the $m^{th}$ transmitter coil and the $n^{th}$ receiver coil,
   $\omega$ is the radian frequency of the transmitter coil current,
   $\mu$ is the magnetic permeability of the response region of the coils,
   $\gamma = \sqrt{j\omega\mu(\sigma_u + j\sigma_v)}$, and
   $V_r$ and $V_x'$ are the in-phase and phase-quadrature components respectively of the received voltage;
   c. detecting those portions $V_r$ and $V_x'$ of the receiver coil voltage which are in-phase with the transmitter coil current and in phase-quadrature with the transmitter coil current; and
   d. combining representations of said in-phase and phase-quadrature components of the receiver coil voltage to compute the parameters $\sigma_u$ and $\sigma_v$, which parameter $\sigma_u$ is representative of the average conductivity of a media surrounding the coil array and which parameter $\sigma_v$ is representative of the heterogeneity of a media surrounding the coil array.

22. The method of claim 21 wherein the step of combining representations of said in-phase and phase-quadrature components includes the steps of selecting values of $\sigma_u$ and $\sigma_v$ and solving said induced voltage expression for values representative of $V_r$ and $V_x'$, testing said computed values of $V_r$ and $V_x'$ to determine if they are acceptable, repeating the steps of selecting and comparing until desired values of $V_r$ and $V_x'$ are obtained, and using as the final values of $\sigma_u$ and $\sigma_v$ those values which give the desired values of $V_r$ and $V_x'$.

23. The method of claim 21 wherein the step of combining representations of said in-phase and phase-quadrature components includes the steps of initially assuming a set of values for $\sigma_u$ and $\sigma_v$, computing values of $V_r$ and $V_x'$ using said initially assumed values of $\sigma_u$ and $\sigma_v$, comparing the relationship of a selected function of the computed values of $V_r$ and/or $V_x'$ with a selected function of the measured values of $V_r$ and/or $V_x'$ to determine if said function of the computed values of $V_r$ and/or $V_x'$ is acceptable, computing new values of $\sigma_u$ and $\sigma_v$ in accordance with the relationship of said functions of the computed and measured values of $V_r$ and/or $V_x'$ if said computed values of $V_r$ and/or $V_x'$ are not acceptable, repeating the steps of comparing and computing new values of $V_r$ and $V_x'$ until acceptable values are found, and using as the final values of $\sigma_u$ and $\sigma_v$ those values which give an acceptable value of said selected function of $V_r$ and/or $V_x'$.

24. The method of claim 21 wherein said induced voltage is proportional to the conductivity $\sigma$ of the adjoining media and said in-phase and phase-quadrature voltage components are proportional to in-phase and phase-quadrature conductivity components $\sigma_r$ and $\sigma_x'$ respectively, the step of combining representations of said in-phase and phase-quadrature components including the steps of initially assuming $\sigma_u = \sigma_r$ and $\sigma_v = 0$, computing values of $\sigma_r$ and $\sigma_x'$ using said initially assumed values of $\sigma_u$ and $\sigma_v$, comparing the relationship of a selected function of the computed values of $\sigma_r$ and/or $\sigma_x'$ with a selected function of the measured values of $\sigma_r$ and/or $\sigma_x'$ to determine if said function of the computed values of $\sigma_r$ and/or $\sigma_x'$ is acceptable, computing a new value of $\sigma_u$ and $\sigma_v$ in accordance with the relationship of said functions of the computed values of $\sigma_r$ and/or $\sigma_x'$ if said computed values of $\sigma_r$ and/or $\sigma_x$ is not acceptable, repeating the steps of comparing and computing new values of $\sigma_r$ and $\sigma_x'$ until acceptable values are found, and using as the final values of $\sigma_u$ and $\sigma_v$ those values which give an acceptable value of said selected function of $\sigma_r$ and/or $\sigma_x'$.

25. The method of claim 21 wherein the step of combining includes the steps of combining representations of said two phase component signals $V_r$ and $V_x'$ to produce a first output signal; forming a non-linear function of said first output signal to produce a second output signal; and combining said first and second output signals to produce a third output signal representative of the function $\sigma_u$.

26. The method of claim 21 wherein the step of combining includes the steps of combining representations of said two phase component signals $V_r$ and $V_x'$ to produce a first output signal; forming a non-linear function of said first output signal to produce a second output signal; combining said first and second output signals to produce a third output signal; and combining said third output signal with one of said phase component signals to produce a signal representative of the function $\sigma_v$.

27. A method of investigating earth formations traversed by a borehole, comprising:
a. moving a coil array through a borehole, said coil array having at least one transmitter coil and at least one receiver coil;
b. energizing said at least one transmitter coil with current to thereby cause a voltage to be induced into said at least one receiver coil, which induced voltage is at least in part representative of certain electrical characteristics of an adjoining formation to the field initiated by the transmitter coil current;
c. detecting those portions of the receiver coil voltage which are in-phase with the transmitter coil current and in phase-quadrature with the transmitter coil current; and
d. converting representations of said phase components to orthogonally related parameters which are non-linearly related to said phase components and representative of the average conductivity and heterogeneity of an earth formation.

28. The method of claim 27 and further including the step of combining said orthogonally related values of average conductivity and heterogeneity to produce individual measurements of the conductivity of different radial portions of a formation.

29. The method of claim 27 wherein said step of combining orthogonally related values of average conductivity $\sigma_u$ and heterogeneity $\sigma_v$ includes additively combining at least a portion of $\sigma_v$ and at least a portion of $\sigma_u$ to obtain a representation of the conductivity of a first radial portion of a formation and subtractively combining at least a portion of $\sigma_v$ with at least a portion of $\sigma_u$ to obtain a representation of the conductivity of a second radial portion of a formation.

30. Apparatus for processing signals derived from an induction logging tool of the type which induces a flow of alternating current in an earth formation and obtains signals representative of the magnitude of first and second mutually quadrature phase components of the electromagnetic field produced by said current flow, comprising:
means for combining said two phase component signals to produce a first output signal;
non-linear function former means for forming a non-linear function of said first output signal to produce a second output signal; and
means for combining said first and second output signals to produce a third output signal representative of the average conductivity of an earth formation.

31. Apparatus for processing signals derived from an induction logging tool of the type which induces a flow of alternating current in an earth formation and obtains signals representative of the magnitude of first and second mutually quadrature phase components of the electromagnetic field produced by said current flow, comprising:
means for combining said two phase component signals to produce a first output signal;
non-linear function former means for forming a non-linear function of said first output signal to produce a second output signal;
means for combining said first and second output signals to produce a third output signal; and
means for combining said third output signal with one of said phase component signals to produce a signal representative of the heterogeneity of an earth formation.

32. A method of processing signals derived from an induction logging tool of the type which induces a flow of alternating current in an earth formation and produces signals representative of the magnitude of first and second mutually quadrature phase components of the electromagnetic field produced by said current flow, comprising:
combining representations of said two phase component signals to produce a first output signal;
forming a non-linear function of said first output signal to produce a second output signal; and
combining said first and second output signals to produce a third output signal representative of the average conductivity of an earth formation.

33. A method of processing signals derived from an induction logging tool of the type which induces a flow of alternating current in an earth formation and produces signals representative of the magnitude of first and second mutually quadrature phase components of the electromagnetic field produced by said current flow, comprising:
   combining representations of said two phase component signals to produce a first output signal;
   forming a non-linear function of said first output signal to produce a second output signal;
   combining said first and second output signals to produce a third output signal; and
   combining said third output signal with one of said phase component signals to produce a signal representative of the heterogeneity of an earth formation.

34. A method of processing signals derived from an induction logging tool of the type which induces a flow of alternating current in an earth formation and produces signals representative of the magnitude of first and second mutually quadrature phase components of the electromagnetic field produced by said current flow, comprising:
   combining representations of said two phase component signals in a non-linear manner to produce representations of the average conductivity and heterogeneity of a formation at least one of said representations being non-linearly related to both of said phase components; and
   recording said representations of conductivity and heterogeneity as a function of the depth level at which the phase component signals were obtained.

35. A method of processing signals derived from an induction logging tool of the type which induces a flow of alternating current in an earth formation and produces signals representative of the magnitude of mutually quadrature phase components of the electromagnetic field produced by said current flow, one of said phase components being in-phase with the current which induces current flow in a formation and the other phase component being in phase-quadrature therewith, comprising:
   computing a first parameter representative of a non-linear transformation of a representation of said in-phase component to a corresponding phase-quadrature representation thereof; and
   using said first parameter and a representation of said phase-quadrature component of the receiver coil voltage for computing a second parameter representative of the heterogeneity of an earth formation.

36. A method of processing signals derived from an induction logging tool of the type which induces a flow of alternating current in an earth formation and produces signals representative of the magnitude of first and second mutually quadrature phase components of the electromagnetic field produced by said current flow, comprising:
   combining representations of said two phase component signals to produce first and second representations of the average conductivity and heterogeneity of a formation; and
   combining said values of average conductivity and heterogeneity to produce individual measurements of the conductivity of different radial portions of a formation.

37. A method of processing signals derived from an induction logging tool of the type which induces a flow of alternating current in an earth formation and produces signals representative of the magnitude of first and second mutually quadrature phase components of the electromagnetic field produced by said current flow, comprising: generating representations of an approximation of the conductivity and heterogeneity of an earth formation, computing representations of equivalent phase component signals which would result from a formation of the type which would possess said conductivity and heterogeneity comparing said representations of the equivalent phase component signals with said representations of the measured phase component signals and producing a representation of the difference therebetween, repeatedly adjusting the values of said approximation representations of the conductivity and heterogeneity and re-computing representations of said equivalent phase component signals from said adjusted values for re-comparison with said measured phase component values until said difference representation is reduced below a predetermined value whereupon the last adjusted values of conductivity and heterogeneity are selected as representative of the true formation conductivity and heterogeneity.

38. A method of investigating earth formations traversed by a borehole, comprising:
   a. producing an electromagnetic field in an earth formation surrounding a borehole in response to said generated current;
   b. detecting said electromagnetic field and producing an electrical signal representative of the effect of an earth formation on said electromagnetic field;
   c. detecting selected parameters of said electrical signal and generating parameter signals representative thereof; and
   d. combining representations of said parameter signals in a non-linear manner to produce representations of the average conductivity and the heterogeneity of an earth formation, each of said produced representations being non-linearly related to at least one of said selected parameters.

39. A method of processing signals derived from an induction logging tool of the type which induces a flow of alternating current in an earth formation and produces signals representative of the magnitude of first and second mutually quadrature phase components of the electromagnetic field produced by said current flow, comprising:
   combining representations of said two phase component signals to produce representations of the average conductivity and heterogeneity of a formation; and
   dividing a representation of the heterogeneity by a representation of at least the average conductivity to produce a normalized indication of the formation heterogeneity.

40. A method of processing signals derived from an induction logging tool of the type which induces a flow of alternating current in an earth formation and produces signals representative of the magnitude of first and second mutually quadrature phase components of the electromagnetic field produced by said current flow, comprising:
   combining representations of said two phase component signals in a non-linear manner to produce representations of the average conductivity and heterogeneity of a formation, each of said representations being non-linearly related to at least one of said phase component signals; and recording said representations of conductivity and heterogeneity as a function of the depth level at which the phase component signals were obtained.

41. A method of processing signals derived from an induction logging tool of the type which induces a flow of alternating current in an earth formation and produces signals representative of the magnitude of two parameters of the electromagnetic field produced by said current flow, comprising:

combining representations of said two signals to produce representations of the average conductivity and heterogeneity of a formation; and combining said representations of average conductivity and heterogeneity to produce individual output representations of different radial portions of a formation.

42. The method of claim 41 wherein the step of combining representations of average conductivity and heterogeneity includes the steps of additively combining at least a portion of the average conductivity representation with at least a portion of the heterogeneity representation to obtain a representation of the conductivity of a first radial portion of a formation and subtractively combining at least a portion of the heterogeneity representation with at least a portion of the average conductivity representation to obtain a representation of the conductivity of a second radial portion of a formation, said second portion being non-exclusive of said first portion.

43. The method of claim 35 and further including the step of using a representation of said in-phase component of the receiver coil voltage for computing a representation of the conductivity of an earth formation which is non-linearly related to said in-phase component.

44. The method of claim 43 and further including the step of combining said conductivity and heterogeneity representations to compute the individual conductivities of different non-exclusive radial portions of a formation.

45. The method of claim 44 wherein the step of combining representations of conductivity and heterogeneity includes the steps of additively combining at least a portion of the average conductivity representation with at least a portion of the heterogeneity representation to obtain a representation of the conductivity of a first radial portion of a formation and subtractively combining at least a portion of the heterogeneity representation with at least a portion of the average conductivity representation to obtain a representation of the conductivity of a second radial portion of a formation, said second portion being non-exclusive of said first portion.

46. A method of processing signals derived from an induction logging tool of the type which induces a flow of alternating current in an earth formation and produces signals representative of the magnitude of first and second mutually quadrature phase components of the electromagnetic field produced by said current flow comprising:

combining representations of said two phase component signals to produce first and second representations of different formation parameters; and combining said formation parameter representations to produce individual measurements of the conductivity of different, non-exclusive radial portions of a formation.

47. The method of claim 35 wherein said first parameter is computed as a function of the logarithm of said in-phase component.

48. The method of claim 35 wherein the step of computing a first parameter includes the steps of computing a non-linear function of said in-phase component, and combining said computed non-linear function of said in-phase signal with a linear function of said in-phase component to produce said first parameter.

49. The method of claim 35 wherein said first parameter Log $\sigma_{xb}$ is computed in accordance with the following expression:

$$\text{Log } \sigma_{xb} = P + Y \text{Log } \sigma_r + Q\sigma_r$$

where $P$, $Y$ and $Q$ are constants and $\sigma_r$ is said in-phase component.

50. The method of claim 49 wherein said constant $Y$ is equal to three-halves.

51. The method of claim 49 wherein the step of using said first parameter and a representation of said phase-quadrature component to compute a second parameter includes the steps of taking the antilog of said first parameter to produce a signal $\sigma_{xb}$, and subtractively combining a function of $\sigma_{xb}$ with a function of said phase-quadrature component to produce said heterogeneity representation.

* * * * *